United States Patent
Das et al.

(10) Patent No.: US 9,392,601 B2
(45) Date of Patent: *Jul. 12, 2016

(54) TECHNIQUES FOR DETERMINING WHETHER TO UTILIZE SYSTEM INFORMATION BETWEEN MULTIPLE BANDWIDTH CARRIERS

(71) Applicant: QUALCOMM Incorporated, San Diego, CA (US)

(72) Inventors: Soumya Das, San Diego, CA (US); Ozgur Dural, San Diego, CA (US); Edwin Chongwoo Park, San Diego, CA (US); Samir Salib Soliman, Poway, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/041,725

(22) Filed: Sep. 30, 2013

(65) Prior Publication Data

US 2015/0092674 A1    Apr. 2, 2015

(51) Int. Cl.
*H04W 72/04* (2009.01)
*H04W 72/12* (2009.01)
(Continued)

(52) U.S. Cl.
CPC .......... *H04W 72/0453* (2013.01); *H04W 48/16* (2013.01); *H04W 72/1263* (2013.01); *H04W 28/18* (2013.01); *H04W 36/0005* (2013.01); *H04W 36/04* (2013.01); *H04W 48/12* (2013.01)

(58) Field of Classification Search
CPC .......................... H04W 72/02; H04W 36/0005
USPC ........................................................ 370/329
See application file for complete search history.

(56) References Cited

U.S. PATENT DOCUMENTS 8,042,033 B2   10/2011   Karmanenko et al.
8,233,922 B2    7/2012   Petrovic et al.
(Continued)

FOREIGN PATENT DOCUMENTS

EP           1909523 A1    4/2008
WO     WO-2008062971 A1    5/2008
(Continued)

OTHER PUBLICATIONS

ISA/EPO, International Search Report and Written Opinion of the International Searching Authority, Int'l App. No. PCT/US2014/055839, Dec. 23, 2014, European Patent Office, Rijswijk, NL, 12 pgs.

(Continued)

*Primary Examiner* — Ian N Moore
*Assistant Examiner* — Mewale Ambaye
(74) *Attorney, Agent, or Firm* — Holland & Hart LLP

(57) ABSTRACT

Methods, systems, and devices are provided for system information management in a wireless communications. A user equipment (UE) may identify a first value of a value tag in a first carrier, read a system information block (SIB) on the first carrier associated with the value tag, and identify a second value of the value tag in a second carrier. The UE may compare the first value with the second value and determine whether the read SIB on the first carrier may be utilized on the second carrier. Other techniques may include identifying a first value of a value tag for a first carrier linked with a SIB transmitted over the first carrier. The techniques may include determining a second value of the value tag for a second carrier indicating whether the SIB transmitted over the first carrier may be utilized on the second carrier.

29 Claims, 15 Drawing Sheets

(51) Int. Cl.
*H04W 48/16* (2009.01)
*H04W 36/00* (2009.01)
*H04W 36/04* (2009.01)
*H04W 48/12* (2009.01)
*H04W 28/18* (2009.01)

(56) References Cited

U.S. PATENT DOCUMENTS

| | | | | |
|---|---|---|---|---|
| 8,412,211 | B2* | 4/2013 | Petrovic | H04W 72/042 370/312 |
| 2005/0153700 | A1* | 7/2005 | Farnsworth et al. | 455/446 |
| 2007/0287440 | A1* | 12/2007 | Benkert | H04W 24/04 455/422.1 |
| 2011/0038296 | A1* | 2/2011 | Yi | H04W 72/005 370/312 |
| 2011/0261759 | A1 | 10/2011 | Yamada et al. | |
| 2011/0267978 | A1* | 11/2011 | Etemad | H04L 5/003 370/254 |
| 2012/0300725 | A1* | 11/2012 | Kwon | H04L 1/0027 370/329 |
| 2013/0010619 | A1* | 1/2013 | Fong et al. | 370/252 |
| 2013/0028149 | A1* | 1/2013 | Chen et al. | 370/280 |
| 2015/0092672 | A1 | 4/2015 | Das et al. | |

FOREIGN PATENT DOCUMENTS

| | | |
|---|---|---|
| WO | WO-2011035420 A1 | 3/2011 |
| WO | WO-2012084001 A1 | 6/2012 |
| WO | WO 2014/129951 * | 2/2013 |
| WO | WO-2013032163 A1 | 3/2013 |
| WO | WO-2014129951 A1 | 8/2014 |

OTHER PUBLICATIONS

IPEA/EPO, Second Written Opinion of the International Preliminary Examining Authority, Int'l. App. No. PCT/US2014/055839, Sep. 7, 2015, European Patent Office, Munich,DE, 8 pgs.

3GPP TSG-RAN WG2 Meeting #67: System Information Modification Indication in Carrier Aggregation, Panasonic, R2-094187, Shenzhen, CN, Aug. 24-28, 2009, 3 pgs.

* cited by examiner

TECHNIQUES FOR DETERMINING WHETHER TO UTILIZE SYSTEM INFORMATION BETWEEN MULTIPLE BANDWIDTH CARRIERS

BACKGROUND

Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, 3GPP Long Term Evolution (LTE) systems, and orthogonal frequency-division multiple access (OFDMA) systems.

Service providers are typically allocated blocks of frequency spectrum for exclusive use in certain geographic regions. These blocks of frequencies are generally assigned by regulators regardless of the multiple access technology being used. In most cases, these blocks are not integer multiples of channel bandwidths, hence there may be unutilized parts of the spectrum. As the use of wireless devices has increased, the demand for and value of this spectrum has generally surged, as well. Nonetheless, in some cases, wireless communications systems may not utilize portions of the allocated spectrum because the portions are not big enough to fit a standard or normal waveform. The developers of the LTE standard, for example, recognized the problem and decided to support many different system bandwidths (e.g., 1.4, 3, 5, 10, 15 and 20 MHz). This may provide one partial solution to the problem. Flexible bandwidth systems, which may also be referred to as scalable bandwidth systems, may provide another solution for better utilization of bandwidth resources; however, some flexible bandwidth systems may face resources issues when they include multiple carriers that may utilize different bandwidths. Particularly, in transitioning between a normal bandwidth carrier to a flexible bandwidth carrier, or between different flexible bandwidth carriers, system information acquisition latency may be increased.

SUMMARY

Methods, systems, and devices are provided for system information (SI) management in wireless communication. These tools and techniques may be utilized for acquiring, obtaining, utilizing, and/or managing SI in wireless communications systems that utilize one or more flexible bandwidth carriers. Methods, systems, and devices, for example, are provided that may expedite SI acquisition by utilizing an additional value tag, such as a differential value tag or a cross-carrier value tag, that is different from a normal value tag to indicate a change in a system information block (SIB) in a carrier on one frequency with respect to a corresponding SIB in another carrier on another frequency, in the same cell or a different cell. With the differential value tag, a wireless communication device, for example a user equipment (UE), which has read a SIB on a first carrier in a first cell may not need to re-read the same SIB on a second carrier in the first cell or in a second cell depending on the differential value tag. By not having to re-read the SIB on the second carrier, SI acquisition may be expedited in both idle and connected mode of the UE. Differential value tags may be implemented in normal UMTS carriers systems, flexible bandwidth or scalable bandwidth carrier systems, or systems utilizing combinations of both normal and flexible bandwidth carriers. The use of differential tag values may also result in reducing a frequency of SIB scheduling.

Flexible bandwidth carriers, also referred to as scalable bandwidth carriers throughout this disclosure, for wireless communications systems may utilize portions of spectrum that may not be big enough to fit a normal waveform utilizing flexible bandwidth waveforms. A flexible bandwidth system that utilizes a flexible bandwidth carrier may be generated with respect to a normal bandwidth system through dilating, or scaling down, the time or the chip rate of the flexible bandwidth system with respect to the normal bandwidth system. Some embodiments may increase the bandwidth of a waveform through expanding, or scaling up, the time or the chip rate of the flexible bandwidth system.

Some embodiments include a method for system information in a wireless communications system. The method may include: identifying a first value of a value tag for a first carrier; and/or determining a second value of the value tag for a second carrier. The first value of the value tag may be linked with a system information block (SIB) transmitted over the first carrier, and the second value of the value tag may indicate with respect to the first value of the value tag whether the SIB transmitted over the first carrier is to be utilized with respect to the second carrier.

In some embodiments, identifying the first value of the value tag for the first carrier and determining the second value of the value tag for the second carrier may be performed at a Radio Access Network. In other embodiments, the identifying and the determining may occur at a base station. In some cases, the identifying may occur at a first base station and the determining may occur at a second base station. In other cases, the identifying may occur at a first base station and the determining may occur at a Radio Network Controller (RNC).

In some cases, the method may include broadcasting, from a base station, the second value of the value tag over the second carrier. In further cases, the method may include receiving, at the base station, the first value of the value tag. Some embodiments of the method may include synchronizing one or more values of the value tag with respect to the first carrier and the second carrier. In some cases, the synchronizing may occur at least at a first base station, a second base station, a controller, or a core network device.

In some embodiments of the method, the first value of the value tag for the first carrier may equal the second value of the value tag for the second carrier. In other embodiments, the first value of the value tag for the first carrier may differ from the second value of the value tag for the second carrier. The value tag, in some embodiments, may be a differential value tag to indicate whether a change of the SIB between the first carrier and the second carrier has occurred.

Some embodiments of the method may further include reducing a frequency of SIB scheduling based on utilizing the value tag. In some cases, the method may include utilizing one or more offsets to determine one or more values in the SIB for the second carrier with respect to the read SIB for the first carrier.

In some embodiments, the value tag may include a major value tag portion and a minor value tag portion. In some cases, the major value tag portion may be utilized to indicate when the read SIB with respect to the first carrier is to be utilized with respect to the second carrier, and the minor value tag portion may be utilized to indicate a change of a SIB for the second carrier with respect to a read SIB for the second carrier.

The first carrier, in some embodiments, may include a normal bandwidth carrier and the second carrier may include a flexible bandwidth carrier. In other embodiments, the first carrier may include a flexible bandwidth carrier and the second carrier may include a normal bandwidth carrier. In yet other embodiments, the first carrier may include a first flexible bandwidth carrier and the second carrier may include a second flexible bandwidth carrier. In further embodiments, the first carrier may include a first normal bandwidth carrier and the second carrier may include a second normal bandwidth carrier.

Some embodiments include a system for system information in a wireless communications system. The system may include: means for identifying a first value of a value tag for a first carrier; and/or means for determining a second value of the value tag for a second carrier. The first value of the value tag may be linked with a system information block (SIB) transmitted over the first carrier, and the second value of the value tag may indicate with respect to the first value of the value tag whether the SIB transmitted over the first carrier is to be utilized with respect to the second carrier.

The system may include means for broadcasting, from a base station, the second value of the value tag over the second carrier. In some embodiments, the system may also include means for receiving, at the base station, the first value of the value.

Some embodiments of the system may include means for synchronizing one or more values of the value tag with respect to the first carrier and the second carrier. The synchronizing may occur at least at a first base station, a second base station, a controller, or a core network device.

In some cases, the identifying and the determining may occur at a Radio Access Network (RAN). In other cases, the identifying and the determining may occur at a base station. In some cases, the identifying may occur at a first base station and the determining may occur at a second base station. Alternatively, the identifying may occur at a first base station and the determining may occur at a Radio Network Controller (RNC).

In some embodiments of the system, the first value of the value tag for the first carrier may equal the second value of the value tag for the second carrier. In other embodiments, the first value of the value tag for the first carrier may differ from the second value of the value tag for the second carrier. In some cases, the value tag may be a differential value tag to indicate whether a change of the SIB between the first carrier and the second carrier has occurred.

The system, in some embodiments, may include means for reducing a frequency of SIB scheduling based on utilizing the value tag. Additionally or alternatively, the system may also include means for utilizing one or more offsets to determine one or more values in the SIB for the second carrier with respect to the read SIB for the first carrier.

In some embodiments, the value tag may include a major value tag portion and a minor value tag portion. In some cases, the major value tag portion may be utilized to indicate when the read SIB with respect to the first carrier is to be utilized with respect to the second carrier, and the minor value tag portion may be utilized to indicate a change of a SIB for the second carrier with respect to a read SIB for the second carrier.

Some embodiments may include a computer program product for system information in a wireless communications system. The computer program product may include a non-transitory computer-readable medium, which may include: code for identifying a first value of a value tag for a first carrier; and/or code for determining a second value of the value tag for a second carrier. The first value of the value tag may be linked with a system information block (SIB) transmitted over the first carrier, and the second value of the value tag may indicate with respect to the first value of the value tag whether the SIB transmitted over the first carrier is to be utilized with respect to the second carrier.

In some embodiments, the code for identifying the first value of the value tag for the first carrier and determining the second value of the value tag for the second carrier may be performed at a Radio Access Network.

The computer program product may include a non-transitory computer-readable medium, which may further include code for broadcasting, from a base station, the second value of the value tag over the second carrier. In some cases, the non-transitory computer-readable medium may include code for receiving, at the base station, the first value of the value tag. In some cases, the computer program product may include a non-transitory computer-readable medium, which may further include code for synchronizing one or more values of the value tag with respect to the first carrier and the second carrier.

Some embodiments may include a wireless communications device configured for system information in a wireless communications system. The wireless communications device may include at least one processor configured to: identify a first value of a value tag for a first carrier; and/or determine a second value of the value tag for a second carrier. The first value of the value tag may be linked with a system information block (SIB) transmitted over the first carrier, and the second value of the value tag may indicate with respect to the first value of the value tag whether the SIB transmitted over the first carrier is to be utilized with respect to the second carrier.

In some embodiments, the at least one processor configured to identify the first value of the value tag for the first carrier and determining the second value of the value tag for the second carrier may be performed at a Radio Access Network. In some embodiments, the at least one processor may be further configured to broadcast, from a base station, the second value of the value tag over the second carrier. In some cases, the at least one processor may be configured to receive, at the base station, the first value of the value tag. In yet other embodiments, the at least one processor may be configured to synchronize one or more values of the value tag with respect to the first carrier and the second carrier.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the spirit and scope of the appended claims. Features which are believed to be characteristic of the concepts disclosed herein, both as to their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
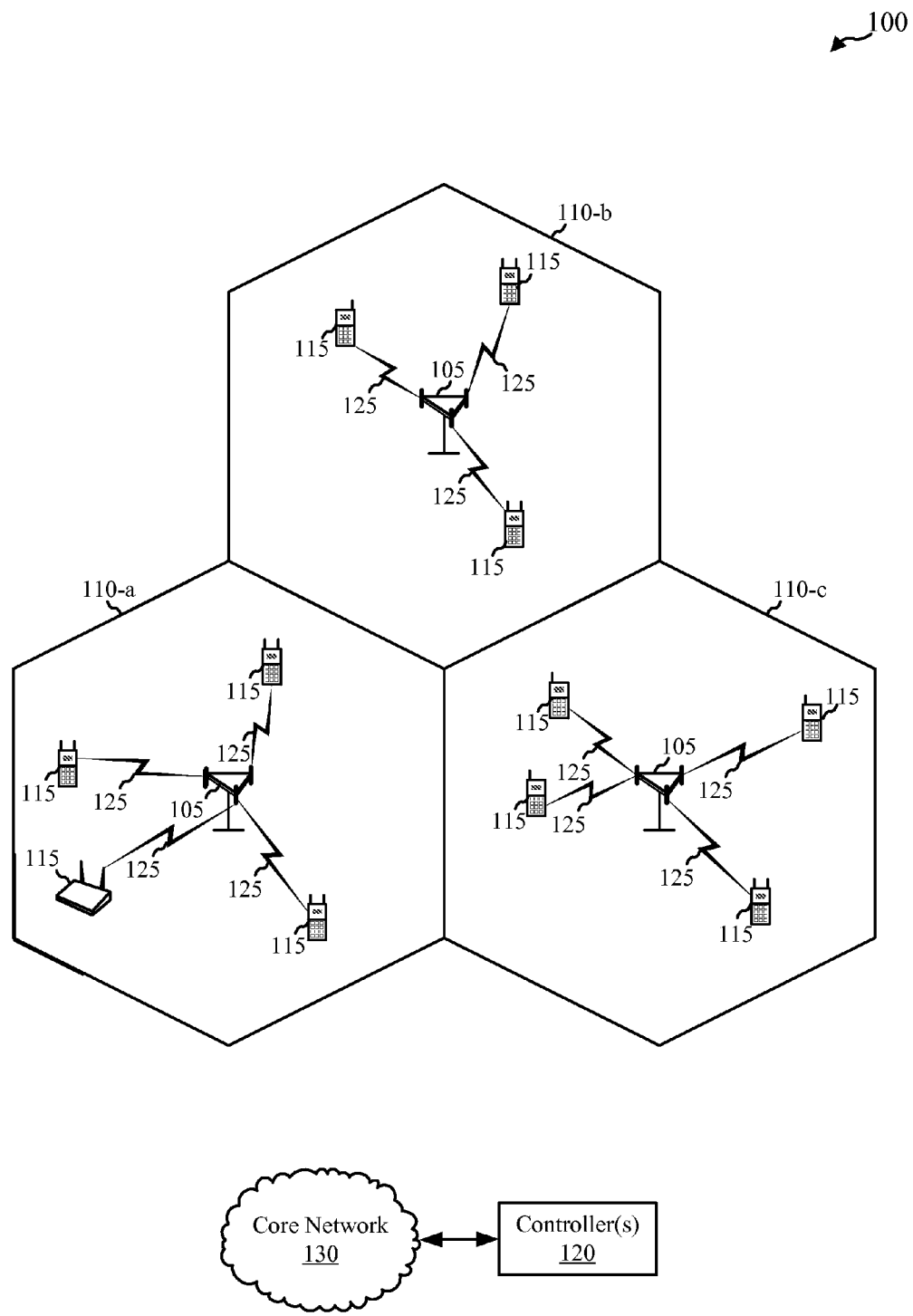
FIG. 1 shows a block diagram of a wireless communications system in accordance with various embodiments.

Methods, systems, and devices are provided for system information (SI) management in wireless communications. These tools and techniques may be utilized for acquiring, obtaining, utilizing, and/or managing SI in wireless communications systems that utilize one or more flexible bandwidth carriers. Methods, systems, and devices, for example, are provided that may expedite system information (SI) acquisition for a user equipment (UE) on a flexible or scalable bandwidth carrier that has already read system information on a normal bandwidth carrier or another flexible bandwidth carrier. These methods may also be used to expedite system information acquisition for a UE on a normal bandwidth carrier that has already read system information on a flexible bandwidth carrier. These methods may also be applicable for other Radio Access Technologies (RATs), such as LTE, and also for normal bandwidth cells on different frequencies.

Flexible bandwidth carriers, which may also be referred to as scalable bandwidth carriers, for wireless communications systems may utilize portions of spectrum that may not be big enough to fit a normal waveform utilizing flexible bandwidth waveforms. A flexible bandwidth system that utilizes a flexible bandwidth carrier may be generated with respect to a normal bandwidth system through dilating, or scaling down, the time or the chip rate of the flexible bandwidth system with respect to the normal bandwidth system. Some embodiments may increase the bandwidth of a waveform through expanding, or scaling up, the time or the chip rate of the flexible bandwidth system.

Typically, a value tag may be utilized to indicate a change in a system information block (SIB) with respect to that transmitted earlier in the same cell or public land mobile network (PLMN). An additional value tag may be utilized, which may be referred to as a differential value tag or crosscarrier value tag. The differential value tag may be utilized to indicate a change in a SIB with respect to the SIB in the same cell on another frequency or with respect to the SIB in a different cell on the same frequency or a different frequency. In some cases, the carriers may have different bandwidths.

With the differential value tag, a UE that has read a SIB on a cell or a carrier (e.g., a normal UMTS carrier) may not need to re-read the same SIB on another cell or another carrier (e.g., a flexible or scalable UMTS carrier) depending on the differential value tag. This may help in expediting the SI acquisition in a flexible bandwidth system. The differential value tag may be utilized in addition to the normal value tag. In some cases, the differential value tag may indicate that a UE needs to read a SIB immediately after moving to another carrier. In other cases, the differential value tag may indicate that the UE can read the SIB at a later time if there are any subsequent changes made in that SIB. The use of differential value tags may improve efficiency in SI acquisition over existing systems because in these systems, a UE would read a SIB irrespective of the normal value tag, i.e. every time the UE changes carriers. By utilizing differential value tags, a UE may not have to read a given SIB as often.

For example, methods for system information acquisition in a wireless communications system are provided where a UE may read one or more SIBs with respect to a first carrier. The first carrier may be a normal bandwidth carrier. The UE may then identify one or more values of a differential value tag with respect to a second carrier. The differential value tags may indicate when the one or more read SIBs read in a first carrier may be utilized in the second carrier without re-reading the concerned SIBs in the second carrier. The differential value tag may also indicate which SIB can be read at some later time. The second carrier may be a flexible bandwidth carrier. In some cases, the first carrier may be a first flexible bandwidth carrier and the second carrier may be a second flexible bandwidth carrier different from the first bandwidth carrier. The two flexible bandwidth carriers may have the same or different bandwidth scaling factors.

The UE may determine to skip reading one or more SIBs in the second carrier based on the comparison of the one or more identified values of the differential value tag conveyed in the Master Information Block (MIB) of the second carrier with the one or more identified values of the differential value tag for the SIBs read in the first carrier. The UE may store the corresponding normal value tags (i.e., not differential value tags) so that it may know when it has to re-read the SIBs in the second carrier at a later time, but not necessarily to read immediately. The use of differential value tags may be particularly beneficial during the transition period of the UE. In some cases, when the UE determines there is no need to read the SIB in the second carrier based on the differential value tag, it may read the normal value tag for that SIB in the second carrier in the same cell. Later, if the normal value tag changes, this may indicate that the SIB value has changed and the UE may re-read the SIB.

A different value of differential value tag for one or more SIBs read in the first carrier and stored in the UE with respect to the value of differential value tag read in the second carrier may indicate a change of one or more SIBs between the first carrier and the second carrier. The value tag may also be referred to as a cross-carrier value tag. As such, the value of the value tags across the carriers may be coordinated. For those SIBs that the UE identifies to read immediately based on differential value tags, the process may be as done today with the well-known value tags. The UE may read the SIBs the first time and subsequent times based on the value tag.

The use of a differential value tag may result in reducing a frequency of SIB scheduling. In some cases, one or more offsets may be utilized to determine one or more values in the one or more SIBs for the second carrier with respect to the one or more read SIBs for the first carrier. These offsets across differential carriers may be agreed to a priori between the UE and the Radio Access Networks (RANs) so that the UE does not need to re-read the SIBs if the only change in SIBs between the first and second carriers maybe due to the offsets being different. In some cases, the offsets may be due to the first carrier and the second carrier having different bandwidth scaling factors; however the claimed subject matter is not so limited. In some cases, the UE may re-read the one or more SIBs at a later time.

Methods and systems are also provided to split the value tag into a first value tag and a second value tag. The first value tag may be referred to as a major value tag and the second value tag may be referred to as a minor value tag. The first value tag may be utilized to indicate when the one or more read SIBs with respect to the first carrier are to be utilized with respect to the second carrier. The second value tag may be utilized to indicate a change of one or more SIBs for the second carrier with respect to one or more read SIBs for the second carrier.

For example, the SIB (e.g., the pertinent SIB) may be read on a change of a major value tag when changing frequencies (or layers). If the major value tag is the same between the two layers, the pertinent SIBs may not have to be read, or may not have to be read immediately (i.e., there may be some time to read the SIB). The major value tag may be "synchronized" across layers. The term "synchronized" may mean that they have to be cognizant with each other layer's value tag. Each layer or frequency can update the pertinent SIB and the major value tag independently or together. Having the same major value tag and the same minor value tag does not necessarily mean that the two layers got updated at the same time since the minor value tag can be updated without the different layers being cognizant of the other layer's change. In some cases, the minor value tag may not have to change (or reset) on a change of a major value tag. Having a distinction from the major and minor value tag may be used to signal to UEs on the current layer. When the minor value tag changes, those UEs may know that the related system information has changed. It may read the new SIBs immediately or read them at a later time.

In some cases, a UE going from one frequency to another frequency that sees the same major value tag may not have to re-read the SIB immediately. Depending on implementation and standard, it may not have to read it at all or can delay for a time before reading the pertinent SIB. If a UE on a layer sees a minor value tag has changed, it may continue to treat this change as a change in the original value tag. It may then re-read the pertinent SIB.

The major value tag may not be shared on different layers unless the intent is that the pertinent SIB does not have to be read (or read immediately). During a change of a major value tag, it may be changed to a nonconsecutive major value tag so the major value tag may not be shared across the layers. During this process, some type of buffer may be put between the different layers.

Techniques described herein may be used for various wireless communications systems such as CDMA, TDMA, FDMA, OFDMA, SC-FDMA, Peer-to-Peer, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA or OFDM system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above, as well as other systems and radio technologies.

Thus, the following description provides examples, and is not limiting of the scope, applicability, or configuration set forth in the claims. Changes may be made in the function and arrangement of elements discussed without departing from the spirit and scope of the disclosure. Various embodiments may omit, substitute, or add various procedures or components as appropriate. For instance, the methods described may be performed in an order different from that described, and various steps may be added, omitted, or combined. Also, features described with respect to certain embodiments may be combined in other embodiments.

Referring first to FIG. 1, a block diagram illustrates an example of a wireless communications system 100 in accordance with various embodiments. The system 100 includes base stations 105, user equipment 115, a base station controller 120, and a core network 130 (the controller 120 may be integrated into the core network 130 in some embodiments; in some embodiments, controller 120 may be integrated into base stations 105). The system 100 may support operation on multiple carriers (waveform signals of different frequencies). Multi-carrier transmitters can transmit modulated signals simultaneously on the multiple carriers. Each modulated signal may be a Code Division Multiple Access (CDMA) signal, Time Division Multiple Access (TDMA) signal, Frequency Division Multiple Access (FDMA) signal, Orthogonal FDMA (OFDMA) signal, Single-Carrier FDMA (SC-FDMA) signal, etc. Each modulated signal may be sent on a different carrier and may carry control information (e.g., pilot signals), overhead information, data, etc. The system 100 may be a multi-carrier LTE network capable of efficiently allocating network resources.

The user equipment 115 may be any type of mobile station, access terminal, subscriber unit, or user equipment. The user equipment 115 may include cellular phones and wireless communications devices, but may also include personal digital assistants (PDAs), smartphones, other handheld devices, netbooks, notebook computers, etc. Thus, the term user equipment should be interpreted broadly hereinafter, including the claims, to include any type of wireless or mobile communications device.

Throughout this application, some user equipment may be referred to as flexible (scalable) bandwidth capable user equipment, flexible (scalable) bandwidth compatible user equipment, and/or flexible (scalable) bandwidth user equipment. This may generally mean that the user equipment is flexible capable or compatible. In general, these devices may also be capable of normal functionality with respect to one or more normal radio access technologies (RATs). The use of the term flexible or scalable as meaning flexible capable or flexible compatible may generally be applicable to other aspects of system 100, such as for controller 120 and/or base stations 105, or a radio access network.

The base stations 105 may wirelessly communicate with the user equipment 115 via one or more base station antennas. The base stations 105 may be configured to communicate with the user equipment 115 under the control of the controller 120 via multiple carriers. Each of the base station 105 sites can provide communication coverage for a respective geographic area. In some embodiments, base stations 105 may be referred to as a NodeB, eNodeB, Home NodeB, and/or Home eNodeB. The coverage area for each base station 105 here is identified as 110-a, 110-b, or 110-c. The coverage area for a base station may be divided into sectors (not shown, but making up only a portion of the coverage area). The system 100 may include base stations 105 of different types (e.g., macro, micro, femto, and/or pico base stations).

The different aspects of system 100, such as the user equipment 115, the base stations 105, the core network 130, and/or the controller 120 may be configured to utilize flexible bandwidth waveforms in accordance with various embodiments. System 100, for example, shows transmissions 125 between user equipment 115 and base stations 105. The transmissions 125 may include uplink and/or reverse link transmission, from a user equipment 115 to a base station 105, and/or downlink and/or forward link transmissions, from a base station 105 to a user equipment 115. The transmissions 125 may include flexible and/or normal waveforms. Normal waveforms may also be referred to as legacy waveforms.

The different aspects of system 100, such as the user equipment 115, the base stations 105, the core network 130, and/or the controller 120 may be configured to utilize flexible bandwidth waveforms in accordance with various embodiments. For example, different aspects of system 100 may utilize portions of spectrum that may not be big enough to fit a normal waveform. Devices such as the user equipment 115, the base stations 105, the core network 130, and/or the controller 120 may be configured to adapt the chip rates, spreading factor, and/or scaling factors to generate and/or utilize flexible bandwidth and/or waveforms. Some aspects of system 100 may form a flexible subsystem (such as certain user equipment 115 and/or base stations 105) that may be generated with respect to a normal subsystem (that may be implemented using other user equipment 115 and/or base stations 105) through dilating, or scaling down, the time of the flexible subsystem with respect to the time of the normal subsystem.

In some embodiments, different aspects of system 100, such as the user equipment 115, the base stations 105, the core network 130, and/or the controller 120 may be configured for provided for system information (SI) in wireless communications. Different aspects of system 100 may be utilized for acquiring, obtaining, utilizing, and/or managing SI in wireless communications systems that utilize one or more flexible bandwidth carriers. In some embodiments, different aspects of system 100, such as the user equipment 115, the base stations 105, the core network 130, and/or the controller 120 may be configured for expediting system information (SI) acquisition latency by utilizing an additional value tag, such as a differential value tag or a cross-carrier value tag, in addition to a normal value tag to indicate a change in a system information block (SIB) with respect to the SIB in the cell on another frequency.

A method for acquiring system information by user equipment 115 may include identifying, at the user equipment, a first value of a value tag on a first carrier reading. The user equipment 115 may read a SIB with respect to the first carrier associated with the value tag. The user equipment may also identify a second value of the value tag in a second carrier. The user equipment may then compare the first value of the value tag in the first carrier with the second value of the value tag in the second carrier, and determine whether the read SIB with respect to the first carrier is to be utilized with respect to the second carrier.

In some embodiments, the user equipment may determine whether the read SIB with respect to the first carrier is to be utilized with respect to the second carrier based on the comparison of the first value of the value tag with the second value of the value tag. The user equipment may utilize, with respect to the second carrier, the read SIB with respect to the first carrier based on the comparison of the first value of the value tag in the first carrier with the second value of the value tag in the second carrier being the same. The user equipment may, conversely, read the SIB with respect to the second carrier based on a comparison of the first and second value tags being different.

The methods described may also be implemented at base station 105 or alternatively at the core network 130, the controller 120, or any combination thereof. A method for managing system information may include identifying, such as by receiving, at base station 105, a first value of a value tag for a first carrier, wherein the first value of the value tag is linked with at least one system information block (SIB) transmitted over the first carrier. The base station 105 may then determine a second value of the value tag for a second carrier, wherein the second value of the value tag indicates with respect to the first value of the value tag whether the at least one SIB transmitted over the first carrier is to be utilized with respect to the second carrier.

In some embodiments, the value tag may be a differential value tag to indicate whether a change of the SIB between the first carrier and the second carrier has occurred. In some cases, the method may further include reducing a frequency of SIB scheduling based on utilizing the value tag. In some cases, one or more offsets may be utilized to determine one or more values in the one or more SIBs for the second carrier with respect to the one or more read SIBs for the first carrier.

In some embodiments, the base station 105 may broadcast the second value of the value tag over the second carrier, for example, to allow user equipments served by base station 105 to utilize a differential value tag and thus reduce SI acquisition latency. Base station 105 may also synchronize one or more values of the value tag with respect to the first carrier and the second carrier.

Methods and systems are also provided to split the value tag into a first value tag and a second value tag, such as a major value tag and a minor value tag. The first value tag may be utilized to indicate when the one or more read SIBs with respect to the first carrier are to be utilized with respect to the second carrier. In some cases, the first value tag may also be utilized to indicate a change of one or more SIBs for the second carrier with respect to one or more read SIBs for the second carrier. The second value tag may be utilized to indicate a change of one or more SIBs for the second carrier with respect to one or more read SIBs for the second carrier. In some cases, the second value tag may also or alternatively be utilized to indicate a change of one or more SIBs for the second carrier with respect to one or more read SIBs for the first carrier.

Figure 2A:
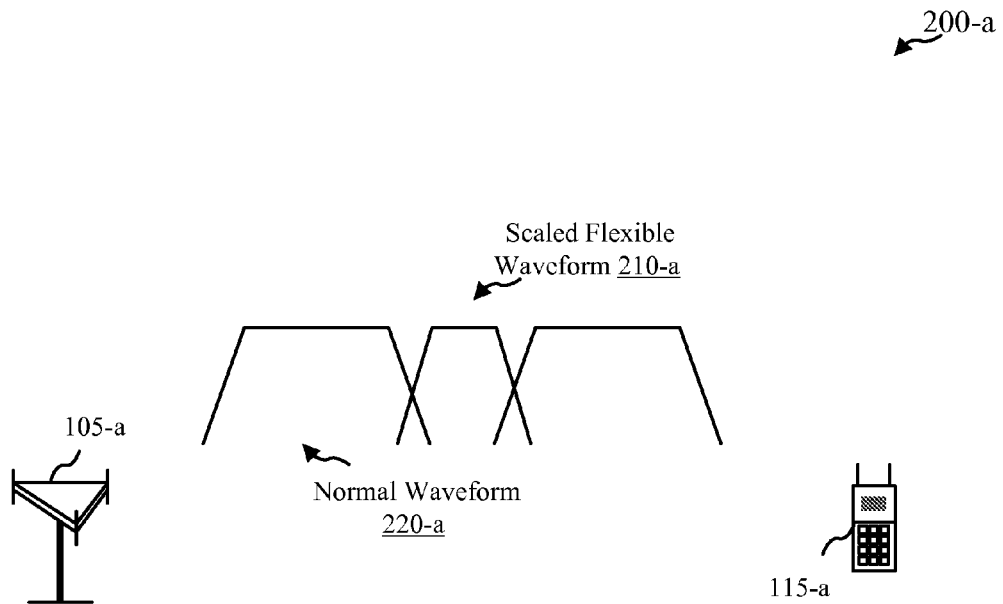
FIG. 2A shows an example of a wireless communications system where a flexible bandwidth waveform fits into a portion of spectrum not broad enough to fit a normal waveform in accordance with various embodiments.

FIG. 2A shows an example of a wireless communications system 200-a with a base station 105-a and a user equipment 115-a in accordance with various embodiments, where a flexible bandwidth waveform 210-a fits into a portion of spectrum not broad enough to fit a normal waveform 220-a. System 200-a may be an example of system 100 of FIG. 1. In some embodiments, the flexible bandwidth waveform 210-a may overlap with the normal waveform 220-a that either the base 105-a and/or the user equipment 115-a may transmit. In some cases, the normal waveform 220-a may completely overlap the flexible bandwidth waveform 210-a. Some embodiments may also utilize multiple flexible bandwidth waveforms 210. In some cases, another base station and/or user equipment (not shown) may transmit the normal waveform 220-a and/or the flexible bandwidth waveform 210-a.

Figure 2B:
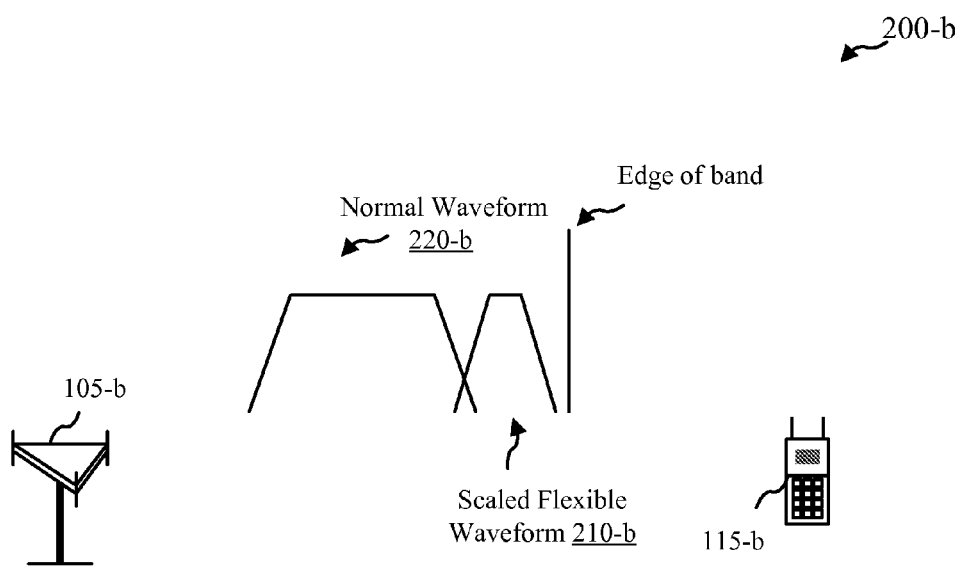
FIG. 2B shows an example of a wireless communications system where a flexible bandwidth waveform fits into a portion of spectrum near an edge of a band in accordance with various embodiments.

FIG. 2B shows an example of a wireless communications system 200-b with a base station 105-b and user equipment 115-b, where a flexible bandwidth waveform 210-b fits into a portion of spectrum near an edge of a band, which may be a guard band, where normal waveform 220-b may not fit. System 200-b may be an example of system 100 of FIG. 1. User equipment 115-a/115-b and/or base stations 105-a/105-b may be configured to dynamically adjust the bandwidth of the flexible bandwidth waveforms 210-a/210-b in accordance with various embodiments.

In some embodiments, different aspects of systems 200-a and/or 200-b, such as the user equipment 115-a and/or 1150-b and/or the base stations 105-a and/or 105-b may be configured for providing expedited system information (SI) acquisition latency for the user equipment 115-a and/or 115-b by utilizing an additional value tag, such as a differential value tag or a cross-carrier value tag, in addition to a normal value tag to indicate a change in a system information block (SIB) with respect to a corresponding SIB in the cell on another frequency.

In general, a first waveform or carrier bandwidth and a second waveform or carrier bandwidth may partially overlap when they overlap by at least 1%, 2%, and/or 5%. In some embodiments, partial overlap may occur when the overlap is at least 10%. In some embodiments, the partial overlap may be less than 99%, 98%, and/or 95%. In some embodiments, the overlap may be less than 90%. In some cases, a flexible bandwidth waveform or carrier bandwidth may be contained completely within another waveform or carrier bandwidth. This overlap may still reflect partial overlap, as the two waveforms or carrier bandwidths do not completely coincide. In general, partial overlap can mean that the two or more waveforms or carrier bandwidths do not completely coincide (i.e., the carrier bandwidths are not the same).

Some embodiments may utilize different definitions of overlap based on power spectrum density (PSD). For example, one definition of overlap based on PSD is shown in the following overlap equation for a first carrier:

$$\text{overlap} = 100\% * \frac{\int_0^\infty PSD_1(f) * PSD_2(f)}{\int_0^\infty PSD_1(f) * PSD_1(f)}.$$

In this equation, $PSD_1(f)$ is the PSD for a first waveform or carrier bandwidth and $PSD_2(f)$ is the PSD for a second waveform or carrier bandwidth. When the two waveforms or carrier bandwidths coincide, then the overlap equation may equal 100%. When the first waveform or carrier bandwidth and the second waveform or carrier bandwidth at least partially overlap, then the overlap equation may not equal 100%. For example, the Overlap Equation may result in a partial overlap of greater than or equal to 1%, 2%, 5%, and/or 10% in some embodiments. The overlap equation may result in a partial overlap of less than or equal to 99%, 98%, 95%, and/or 90% in some embodiments. One may note that in the case in which the first waveform or carrier bandwidth is a normal waveform or carrier bandwidth and the second waveform or a carrier waveform is a flexible bandwidth waveform or carrier bandwidth that is contained within the normal bandwidth or carrier bandwidth, then the overlap equation may represent the ratio of the flexible bandwidth compared to the normal bandwidth, written as a percentage. Furthermore, the overlap equation may depend on which carrier bandwidth's perspective the overlap equation is formulated with respect to. Some embodiments may utilize other definitions of overlap. In some cases, another overlap may be defined utilizing a square root operation such as the following:

$$\text{overlap} = 100\% * \sqrt{\frac{\int_0^\infty PSD_1(f) * PSD_2(f)}{\int_0^\infty PSD_1(f) * PSD_1(f)}}.$$

Other embodiments may utilize other overlap equations that may account for multiple overlapping carriers.

Figure 3:
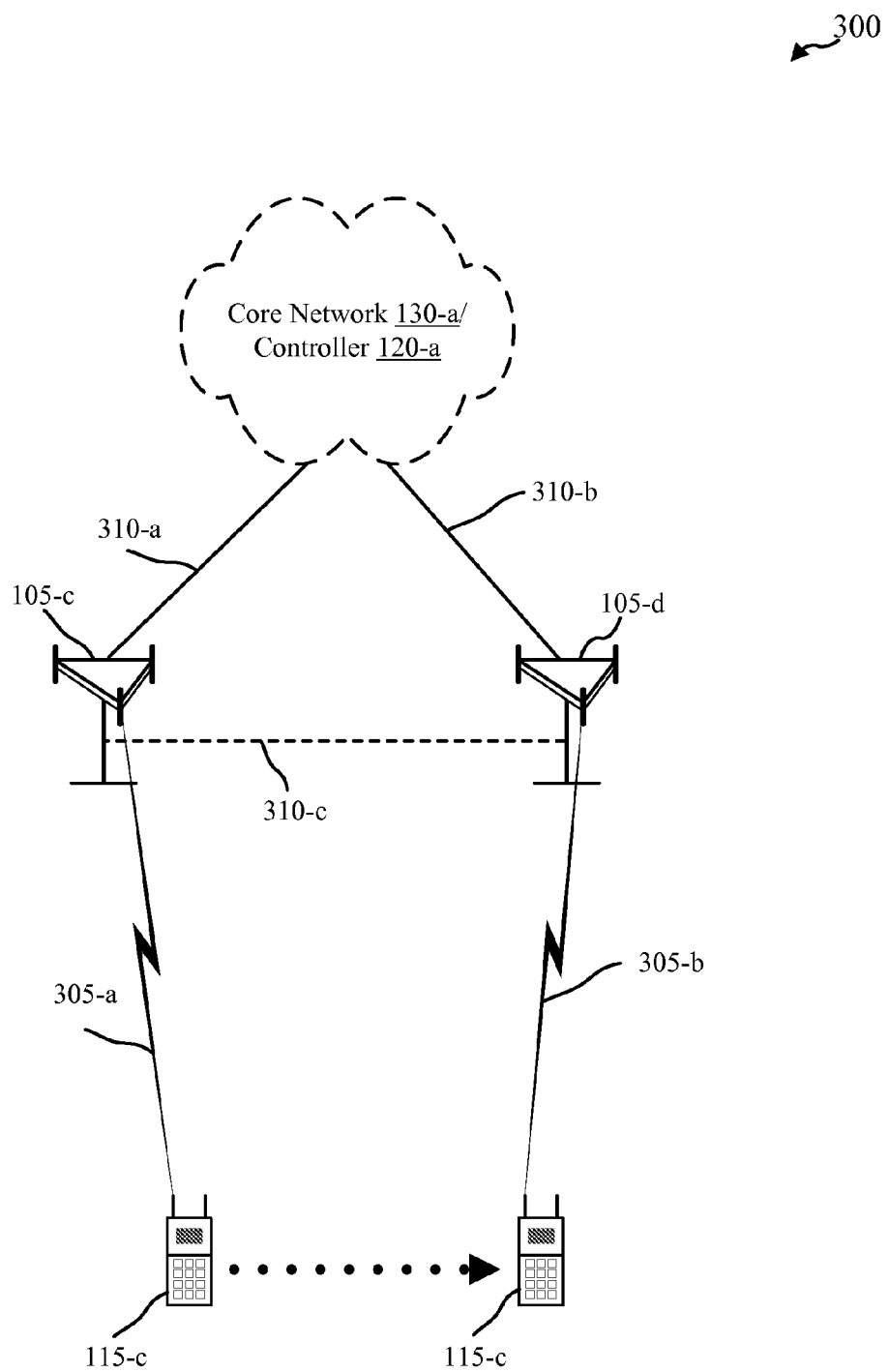
FIG. 3 shows a block diagram of a wireless communications system comprising multiple base stations in accordance with various embodiments.

FIG. 3 shows a wireless communications system 300 with base stations 105-c and 105-d and user equipment (UE) 115-c, in accordance with various embodiments. Different aspects of system 300, such as the user equipment 115-c, base stations 105-c and/or 105-d, the core network 130-a, and/or the controller 120-a may be configured to acquire and/or mange system information, such as by providing expedited system information (SI) acquisition latency for a UE 115-c by utilizing a differential value tag or a cross-carrier value tag, in addition to a normal value tag to indicate a change in a system information block (SIB) with respect to a corresponding SIB in the cell on another frequency. In some embodiments, base station 105-c and base station 105-d may be located or grouped within the same cell.

The UE 115-c may communicate with base station 105-c via communication link 305-a over a first carrier. The UE 115-c may identify a first value of a value tag with respect to the first carrier. Generally, a value tag may be utilized to indicate a change in a system information block (SIB) with respect to that transmitted earlier in the same cell or PLMN. Via the communication link 305-a, the UE may read one or more system information blocks (SIBs) with respect to the first carrier associated with the value tag. The UE 115-c my also identify a second value of the value tag in a second carrier, for example communication link 305-b with base station 105-d, in, for example, preparation for handover or soft handover from base station 105-c to base station 105-d. The UE 115-c may compare the first value of the value tag in the first carrier with the second value of the value tag in the second carrier. The UE 115-c may further determine whether the read SIB with respect to the first carrier can be utilized with respect to the second carrier.

In some embodiments, the UE 115-c may determine whether to utilize the read SIB with respect to the first carrier on the second carrier based on the comparison of the value of the value tags for the first and second carriers. In some cases, if the value of the value tag for the first carrier and the value of the value tag for the second carrier are equal, the UE 115-c may utilize the read SIB on the second carrier and forego re-reading that SIB. In yet other cases, if the value of the value tag for the first carrier and the value of the value tag for the second carrier are different, the UE may read the relevant SIB with respect to the second carrier, as the value tag for the second carrier indicates, with respect to the value of the value tag for the first carrier, that the one or more relevant SIBs have changed.

In some embodiments, the UE 115-c may be operating in an idle mode when comparing the first value of the value tag in the first carrier with the second value of the value tag in the second carrier. In yet other embodiments, the UE 115-c may be operating in single-carrier mode when comparing the first value of the value tag in the first carrier with the second value of the value tag in the second carrier.

In some cases, the value tag may be a differential value tag, also referred to as a cross-carrier value tag, to indicate whether a change of the SIB between the first carrier and the second carrier has occurred. With the differential value tag, the UE 115-c that has read a SIB on the first carrier via communication link 305-a, also referred to as a first cell may not need to re-read the same SIB on a second carrier, which may be via communication link 305-b with base station 105-d, depending on the differential value tag. This may help in expediting the SI acquisition in normal bandwidth systems, flexible or scalable bandwidth systems, or systems utilizing both normal and flexible bandwidth carriers. Furthermore, the differential value tag may be utilized in addition to the normal value tag.

The UE 115-c may determine to skip reading one or more SIBs in the second carrier based on the comparison of the one or more identified values of the differential value tag conveyed in the Master Information Block (MIB) of second carrier with the one or more identified values of the differential value tag for the SIBs read in the first carrier. The UE 115-c may store the corresponding normal value tags so that it may know when it has to re-read the SIBs in the second carrier at a later time, but not necessarily to read immediately. The use of differential value tag may be particularly beneficial during the transition period of the UE 115-c.

A different value of differential value tag for one or more SIBs read in the first carrier and stored in the UE 115-c with respect to the value of differential value tag read in the second carrier may indicate a change of one or more SIBs between the first carrier and the second carrier. As such, the value of the value tags across the carriers may be coordinated. For those SIBs that the UE 115-c identifies to read immediately based on differential value tags, the process may be as done today with the well-known value tags. The UE 115-c may read the SIBs the first time and subsequent times based on the value tag.

The differential value tag may be utilized with a subset of SIBs or for all SIBs with respect to the UE 115-c. The differential value tag may utilize increments of 1 or more than 1 (e.g. when the information on the SIB is updated). In the cases where there may be multiple flexible bandwidth carriers with different bandwidth scaling factors N, the differential value tag could be with respect to one value of N (which could be N=1). In some cases, the differential value tag could be with respect to one bandwidth scaling value N, while others could be with respect to another N. Even if there are multiple flexible bandwidth carriers of the same N in the system, they may also have different parameters. For example, if one N=2 carrier exists at 900 MHz and another N=2 carrier exists at 2100 MHz, they may have different system information. The differential value tag could be with respect to one carrier (or N, etc.). In the instance where the differential value tags are with respect to a specific cell or layer or N, that relationship may be determined autonomously by the UE 115-c (e.g., use the lowest N, lowest frequency, etc.) or can be signaled to the UE 115-c.

In some embodiments, the UE 115-c may utilize one or more offsets to determine one or more values in the one or more SIBs for the second carrier with respect to the one or more read SIBs for the first carrier. This may further result in reducing a frequency of SIB scheduling. The offsets across differential carriers may be agreed to a priori between the UE 115-c and base stations 105-c and 105-d, for example, so that the UE 115-c does not need to re-read the SIBs if the only change in SIBs between the first and second carriers maybe due to the offsets being different.

In some embodiments, the value tag may include a major value tag portion and a minor value tag portion. The major value tag portion may be utilized to indicate when the read SIB with respect to the first carrier is to be utilized with respect to the second carrier. The minor value tag portion may be utilized to indicate a change of a SIB for the second carrier with respect to a read SIB for the second carrier.

For example, the SIB (e.g., the pertinent SIB) may be read on a change of a major value tag when changing frequencies (or layers). If the major value tag is the same between the two layers, the pertinent SIBs may not have to be read, or may not have to be read immediately (i.e., there may be some time to read the SIB). The major value tag, which in some embodiments, may be the only value of the value tag, may be "synchronized" across layers. The term "synchronized" may mean that each layer or carrier may be cognizant of each other layer or carrier's value tag. Each layer or frequency (carrier) can update the pertinent SIB and the major value tag independently or together. Having the same major value tag and the same minor value tag does not necessarily mean that the two layers got updated at the same time since the minor value tag can be updated without the different layers being cognizant of the other layer's change. In some cases, the minor value tag may not have to change (or reset) on a change of a major value tag. Having a distinction from the major and minor value tag may be used to signal to the UE 115-c on the current layer. When the minor value tag changes, the UE 115-*c* may know that the related system information has changed. It may read the new SIBs immediately or read them at a later time.

In some cases, the UE 115-*c* going from one frequency to another frequency that sees the same major value tag may not have to re-read the SIB immediately. Depending on implementation and standard, it may not have to read it at all or can delay for a time before reading the pertinent SIB. If the UE 115-*c* on a layer sees a minor value tag has changed, it may continue to treat this change as a change in the original value tag. It may then re-read the pertinent SIB.

The major value tag may not be shared on different layers unless the intent is that the pertinent SIB does not have to be read (or read immediately). During a change of a major value tag, it may be changed to a nonconsecutive major value tag so the major value tag may not be shared across the layers. During this process, some type of buffer may be put between the different layers.

The base stations 105-*c* and 105-*d* may also communicate with each other over the backhaul, such as an X2 interface in LTE, via communication link 310-*c*. Furthermore, the base stations 105-*c* and 105-*d* may also communicate with the core network 130-*a*, which may be the same as core network 130 and controller 120-*a*, which may be the same as controller 120, over communication links 310-*a* and 310-*b*, respectively. Communication links 310-*a* and 310-*b* may comprise an S1 interface as in LTE, or other such communication links utilized in other RATs. Core network 130-*a*, controller 120-*a*, and base station 105-*c* or 105-*d* may be grouped or bundled in a single wireless communication/network entity, or may be grouped in various sub-groups of wireless communication entities. Accordingly some or all of the functionality described may be performed at one, or various combinations of base stations 105-*c*/105-*d*, core network 130-*a*, and controller 120-*a*.

The methods described above may also be implemented at base station 105 or alternatively at the core network 130, the controller 120, or any combination thereof. A method for managing system information may further include identifying, such as by receiving, at base station 105, a first value of a value tag for a first carrier, wherein the first value of the value tag is linked with at least one system information block (SIB) transmitted over the first carrier. The base station 105 may then determine a second value of the value tag for a second carrier, wherein the second value of the value tag indicates with respect to the first value of the value tag whether the at least one SIB transmitted over the first carrier is to be utilized with respect to the second carrier.

In some embodiments, base station 105-*c* may broadcast the second value of the value tag over the second carrier. In some cases, the base station 105-*c* may also receive the first value of the value tag over the first carrier, from another network entity, such as core network 130-*a*/controller 120-*a*, base station 105-*d*, etc. In some embodiments, the identifying and the determining may occur at either of base station 105-*c* or base station 105-*d*. In other cases, the identifying may occur at base station 105-*c* and the determining may occur at base station 105-*d*, for example. In yet other cases, the identifying may occur at base station 105-*c* and the determining may occur at controller 120-*a*, which may also be a Radio Network Controller (RNC).

In some embodiments, base station 105-*c* and/or base station 105-*d* may synchronize one or more values of the value tag with respect to the first carrier and the second carrier. The synchronizing may also occur at a controller 120-*a*, or a core network 130-*a*.

In some embodiments, base station 105-*c* and/or 105-*d* may determine whether to utilize a first read SIB with respect to a first carrier on a second carrier in a similar manner as described above with respect to the UE 115-*c*. In some cases, a major value tag and a minor value tag may be controlled and/or implemented at base station 105-*c* and/or 105-*d* as also similar described above in relation to the UE 115-*c*. In some cases, all of the functionality performed at the UE 115-*c*, as described above, may also or alternatively be implemented at one of base station 105-*c*/105-*d*, controller 120-*a*, and or core network 130-*a*.

In some embodiments described above, the first carrier may include a normal bandwidth carrier and the second carrier may include a flexible bandwidth carrier. In yet other embodiments, the first carrier may include a flexible bandwidth carrier and the second carrier may include a normal bandwidth carrier. In yet other cases, the first carrier may include a first flexible bandwidth carrier and the second carrier may include a second flexible bandwidth carrier, with the scaling factors of the first carrier and the second carrier being equal or different. In other embodiments, the first carrier may include a first normal bandwidth carrier and the second carrier may include a second normal bandwidth carrier.

Communication links 305-*a* and/or 305-*b* between the user equipment 115-*c* and base stations 105-*c* and 105-*d* may utilize flexible bandwidth waveforms that may be generated to occupy less (or more) bandwidth than a normal waveform. For example, at a band edge, there may not be enough available spectrum to place a normal waveform. For a flexible bandwidth waveform, as time gets dilated, the frequency occupied by a waveform goes down, thus making it possible to fit a flexible bandwidth waveform into spectrum that may not be broad enough to fit a normal waveform. In some embodiments, the flexible bandwidth waveform may be scaled utilizing a scaling factor N with respect to a normal waveform. Scaling factor N may take on numerous different values including, but not limited to, integer values such as 1, 2, 3, 4, 8, etc. N, however, does not have to be an integer.

Some embodiments may utilize additional terminology. A new unit D may be utilized. The unit D is dilated. The unit is unitless and has the value of N. One can talk about time in the flexible system in terms of "dilated time." For example, a slot of say 10 ms in normal time may be represented as 10 Dms in flexible time (note: even in normal time, this will hold true since N=1 in normal time: D has a value of 1, so 10 Dms=10 ms). In time scaling, one can replace most "seconds" with "dilated-seconds." Note frequency in Hertz is 1/s.

As discussed above, a flexible bandwidth waveform may be a waveform that occupies less bandwidth than a normal waveform. Thus, in a flexible bandwidth system, the same number of symbols and bits may be transmitted over a longer duration compared to normal bandwidth system. This may result in time stretching, whereby slot duration, frame duration, etc., may increase by a scaling factor N. Scaling factor N may represent the ratio of the normal bandwidth to flexible bandwidth (BW). Thus, data rate in a flexible bandwidth system may equal (Normal Rate×1/N), and delay may equal (Normal Delay×N). In general, a flexible systems channel BW=channel BW of normal systems/N. Delay×BW may remain unchanged. Furthermore, in some embodiments, a flexible bandwidth waveform may be a waveform that occupies more bandwidth than a normal waveform.

Throughout this specification, the term normal system, subsystem, and/or waveform may be utilized to refer to systems, subsystems, and/or waveforms that involve embodiments that may utilize a scaling factor that may be equal to one (e.g., N=1) or a normal or standard chip rate. These normal systems, subsystems, and/or waveforms may also be referred to as standard and/or legacy systems, subsystems, and/or waveforms. Furthermore, flexible or scalable systems, subsystems, and/or waveforms may be utilized to refer to systems, subsystems, and/or waveforms that involve embodiments that may utilize a scaling factor that may be not equal to one (e.g., N=2, 4, 8, ½, ¼, etc.). For N>1, or if a chip rate is decreased, the bandwidth of a waveform may decrease. Some embodiments may utilize scaling factors or chip rates that increase the bandwidth. For example, if N<1, or if the chip rate is increased, then a waveform may be expanded to cover bandwidth larger than a normal waveform. Flexible or scalable systems, subsystems, and/or waveforms may also be referred to as fractional systems, subsystems, and/or waveforms in some cases. Fractional systems, subsystems, and/or waveforms may or may not change bandwidth, for example. A fractional system, subsystem, or waveform may be flexible because it may offer more possibilities than a normal or standard system, subsystem, or waveform (e.g., N=1 system). Furthermore, the use of the term flexible may also be utilized to mean flexible bandwidth capable.

Figure 4:
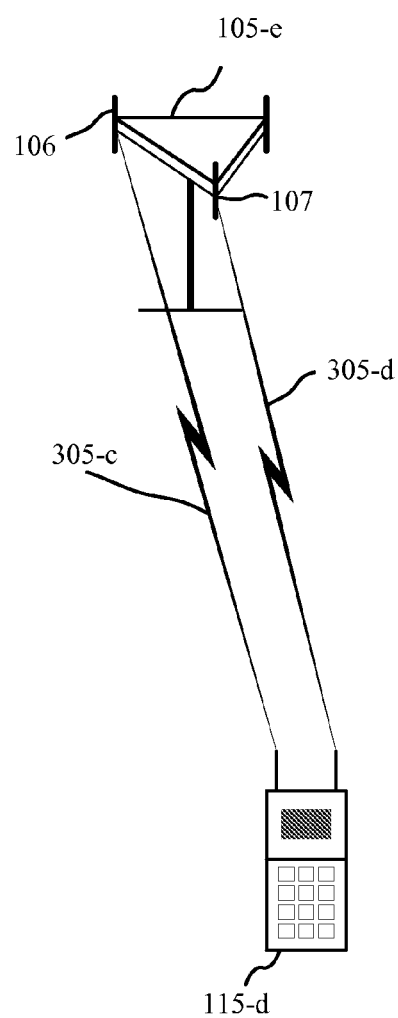
FIG. 4 shows a block diagram of a wireless communications system comprising a base station in accordance with various embodiments.

FIG. 4 shows a wireless communications system 400 with base station 105-e, which may be any one of base stations 105-c/105-d and user equipment (UE) 115-d, which may be UE 115-c, in accordance with various embodiments is shown. Different aspects of system 400, such as the user equipment 115-d and/or base stations 105-e, may be configured to acquire and/or mange system information, such as by providing expedited system information (SI) acquisition latency for a UE 115-d by utilizing a differential value tag or a cross-carrier value tag, in addition to a normal value tag to indicate a change in a system information block (SIB) with respect to a corresponding SIB in the cell on another frequency.

The UE 115-d may communicate with base station 105-e via communication link 305-c over a first carrier via a first antenna or group of antennas 106 and/or via communication link 305-d over a second carrier via a second antenna or group of antennas 107. First antenna 106 and second antenna 107 may also represent different sector in a cell. The UE 115-d may identify a first value of a value tag with respect to the first carrier over communication link 305-c. The UE 115-d my also identify a second value of the value tag in a second carrier, for example via communication link 305-d, in, for example, preparation for handover or soft handover from first antenna 106 to second antenna 107. The UE 115-d may compare the first value of the value tag in the first carrier with the second value of the value tag in the second carrier. The UE 115-d may further determine whether the read SIB with respect to the first carrier can be utilized with respect to the second carrier. Wireless communications system 400 may implement all the methods described above with reference to FIG. 3 with first antenna 106 and second antenna 107 in place of two distinct base stations 105-c and 105-d.

Figure 5A:
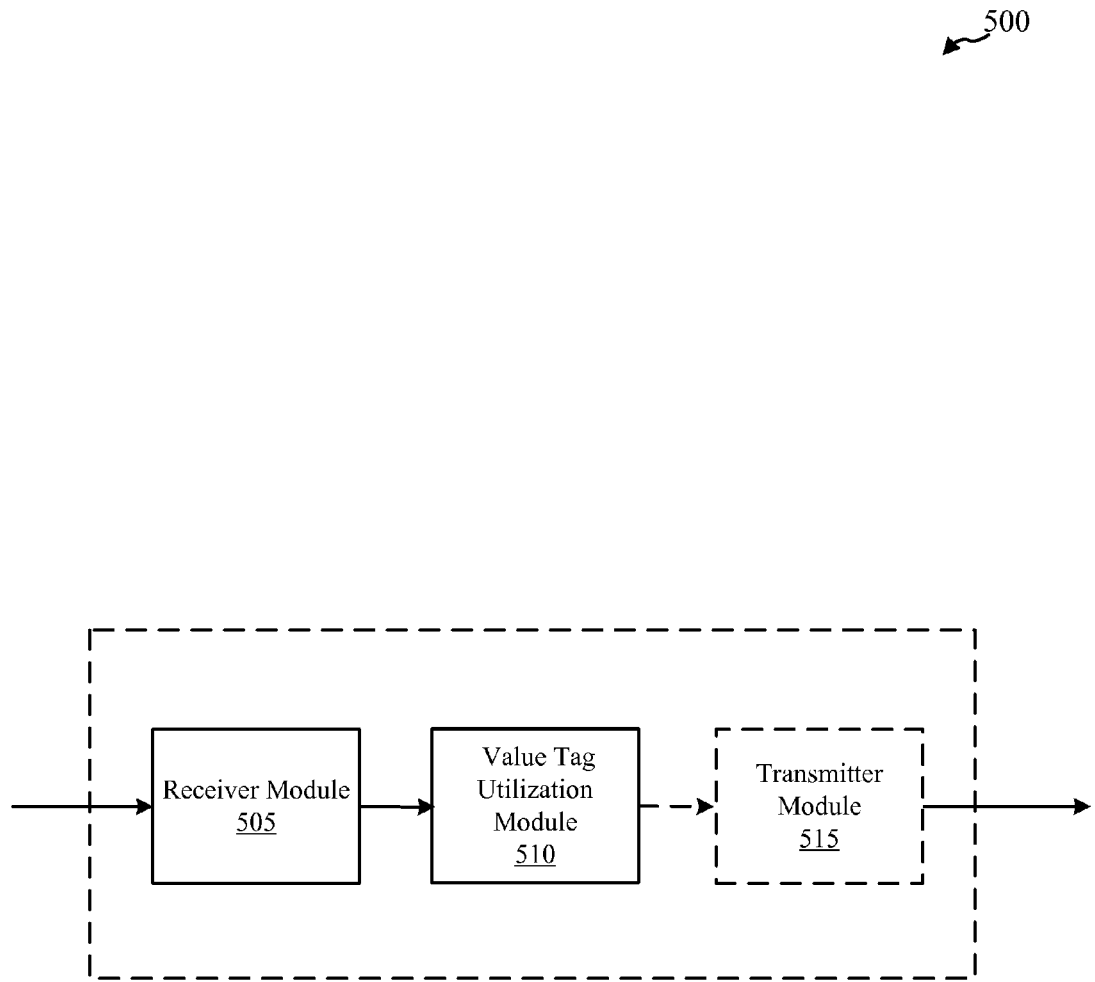
FIG. 5A shows a block diagram of a user equipment that includes value tag processing functionality in accordance with various embodiments.

Turning next to FIG. 5A, a block diagram illustrates a device 500 configured for acquiring and/or managing system information by providing expedited system information (SI) acquisition latency for a UE, such as UE 115-a/115-b/115-c/115-d by utilizing a differential value tag in addition to a normal value tag to indicate a change in a system information block (SIB) with respect to a corresponding SIB in the cell on another frequency, in accordance with various embodiments. The device 500 and/or one or more of the modules of device 500 may be an example of aspects of a UE 115 of FIG. 1, FIG. 2, FIG. 3, and/or FIG. 4, base station 105 of FIG. 1, FIG. 2, FIG. 3, and/or FIG. 4, and/or core network/controller 130/120 of FIG. 1, and/or FIG. 3, including all the functionality described therein. The device 500 may also be a processor.

The device 500 may include a receiver module 505, a value tag utilization module 510, and/or a transmitter module 515. Each of these components may be in communication with each other. Furthermore, in some cases, such as when device 500 may be implemented via a controller 120, for example a Radio Network Controller (RNC), the receiver module 505 and the transmitter module 515 may be located at base station 105, and the value tag utilization module 510 may be located at the controller 120. Device 500 may be implemented via a Radio Access Network (RAN) in general.

These components of the device 500 may, individually or collectively, be implemented with one or more application-specific integrated circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

The receiver module 505 may receive information such as packet, data, and/or signaling information regarding what device 500 has received or transmitted. The received information may be utilized by the value tag utilization module 510 for a variety of purposes.

In some embodiments, value tag utilization module 510 may be configured to acquire and/or manage system information, such as by expediting system information (SI) acquisition latency for a user equipment (UE) on a first carrier that has already read system information on a second bandwidth carrier, by utilizing a cross-carrier value tag in addition to one or more normal value tags.

In some embodiments, the receiver module 505 may receive, and the value tag utilization module 510 may identify, a first value of a value tag on a first carrier reading. The receiver module 505 may further receive, and the value tag utilization module 510 may read, a SIB with respect to the first carrier associated with the value tag. The receiver module 505 may also receive, and the value tag utilization module 510 may identify a second value of the value tag in a second carrier. The value tag utilization module 510 may then compare the first value of the value tag in the first carrier with the second value of the value tag in the second carrier, and determine whether the read SIB with respect to the first carrier may be utilized with respect to the second carrier. The value tag utilization module 510 may communicate the result to the transmitter module 515, which may further transmit a message indicating the result to the appropriate network entity, such as a base station 105, and/or a core network 130/controller 120.

In some embodiments, the value tag utilization module 510 may base the determination of whether the read SIB with respect to the first carrier may be utilized with respect to the second carrier on the comparison of the first and second values of the value tag. In some cases, the value tag utilization module 510 may determine to utilize with respect to the second carrier, the read SIB with respect to the first carrier based on the comparison of the first value of the value tag in the first carrier with the second value of the value tag in the second carrier if the first value of the value tag equals the second value of the value tag. In other cases, the value tag utilization module 510 may determine to read a SIB with respect to the second carrier based on the comparison of the first value of the value tag in the first carrier with the second value of the value tag in the second carrier if the first value of the value tag in the first carrier differs from the second value of the value tag in the second carrier.

In some embodiments, the value tag utilization module 510 may compare the first value of the value tag in the first carrier with the second value of the value tag in the second carrier while the UE 115 is operating in an idle mode. In some cases, the value tag utilization module 510 may compare the first value of the value tag in the first carrier with the second value of the value tag in the second carrier while the UE 115 is operating in a single-carrier mode.

In some embodiments, the value tag utilized by the value tag utilization module 510 may include a differential value tag to indicate whether a change of the SIB between the first carrier and the second carrier has occurred. In some cases, the value tag utilization module 510 may utilize one or more offsets to determine one or more values in the SIB for the second carrier with respect to the read SIB for the first carrier.

In further embodiments, the value tag used by the value tag utilization module 510 may further comprise a major value tag portion and a minor value tag portion. The major value tag portion may be utilized to indicate when the read SIB with respect to the first carrier is to be utilized with respect to the second carrier. The minor value tag portion may be utilized to indicate a change of a SIB for the second carrier with respect to a read SIB for the second carrier.

In some embodiments, in the system 500, the first carrier is a normal bandwidth carrier and the second carrier is a flexible bandwidth carrier. In some cases, the first carrier may comprise a flexible bandwidth carrier and the second carrier may comprise a normal bandwidth carrier. In other cases, the first carrier may comprise a first flexible bandwidth carrier and the second carrier may comprise a second flexible bandwidth carrier. In yet other cases, the first carrier may comprise a first normal bandwidth carrier and the second carrier may comprise a second normal bandwidth carrier.

Figure 5B:
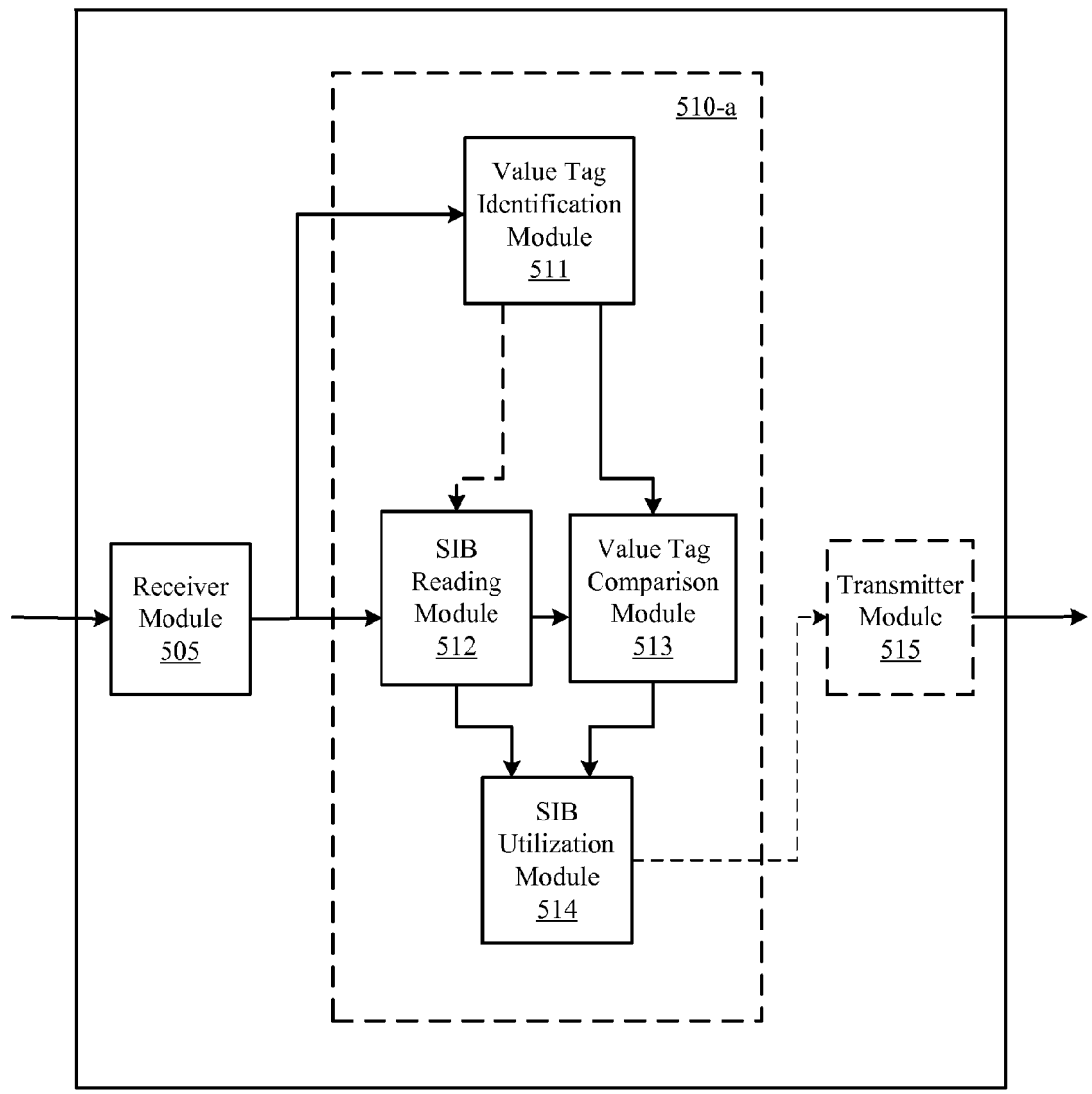
FIG. 5B shows a block diagram of a user equipment that includes value tag processing functionality in accordance with various embodiments.

Turning next to FIG. 5B, a block diagram illustrates a device 500-*a* that includes system information management and acquisition functionality in accordance with various embodiments. The device 500-*a* and/or one or more of the modules of device 500-*a* may be an example of aspects of UE 115 of FIG. 1, FIG. 2, FIG. 3, and/or FIG. 4, base station 105 of FIG. 1, FIG. 2, FIG. 3, and/or FIG. 4, and/or core network/controller 130/120 of FIG. 1, and/or FIG. 3, including all the functionality described therein. The device 500-*a* may also be a processor. The device 500-*a* may include a receiver module 505, a value tag utilization module 510-*a*, which may further include a value tag identification module 511, a SIB reading module 512, a value tag comparison module 513, and a SIB utilization module 514, and/or a transmitter module 515. Each of these components may be in communication with each other. In some cases, such as when device 500-*a* may be implemented via a controller 120, for example a Radio Network Controller (RNC), the receiver module 505 and the transmitter module 515 may be located at base station 105, and the value tag identification module 511, the SIB reading module 512, and the value tag comparison module 513 may be located at the controller 120.

These components of the device 500-*a* may, individually or collectively, be implemented with one or more application-specific integrated circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

The receiver module 505 may receive information such as packet, data, and/or signaling information regarding what device 500-*a* has received or transmitted. The received information may be utilized by value tag identification module 511 and the SIB reading module 512 in conjunction with the value tag comparison module 513 and the SIB utilization module 514, to receive and process SIB information from a first carrier and value tag information from a first and second carrier to reduce SI acquisition latency, in accordance with the various embodiments disclosed herein.

For example, receiver module 505 may receive information including a first value of a value tag in a first carrier, a second value of the value tag in a second carrier, and at least one SIB with respect to the first carrier associated with the value tag. The receiver module 505 may communication this information to the value tag identification module 511 and the SIB reading module 512. The value tag identification module 511 may identify the first value of the value tag with respect to the first carrier and the second value of the value tag with respect to the second carrier. The value tag identification module 511 may then communicate these values to the SIB reading module 512 and the value tag comparison module 513. The SIB reading module 512 may use the identity of the first value of the value tag to correlate the SIB to the first carrier associated with the value tag. The SIB reading module 512 may then communicate the SIB information to the value tag comparison module 513 and the SIB utilization module 514. The value tag comparison module 513 may compare the first value of the value tag with the second value of the value tag and send the results of the comparison to the SIB utilization module 514. The SIB utilization module 514 may then determine if the read SIB with respect to the first carrier may be utilized with respect to the second carrier without requiring the SIB to be re-read on the second carrier. The SIB utilization module 514 may communicate the result to the transmitter module 515, which may further transmit a message indicating the result to the appropriate network entity, such as a base station 105, and/or a core network 130/controller 120.

In some embodiments, different aspects of systems 100, 200-*a*, 200-*b*, 300, and/or 400 such as the UE 115, the base stations 105, the core network 130, and/or the controller 120 may be configured for reducing SI acquisition latency for a UE by utilizing a differential value tag as described above with reference to FIG. 5B.

Figure 6A:
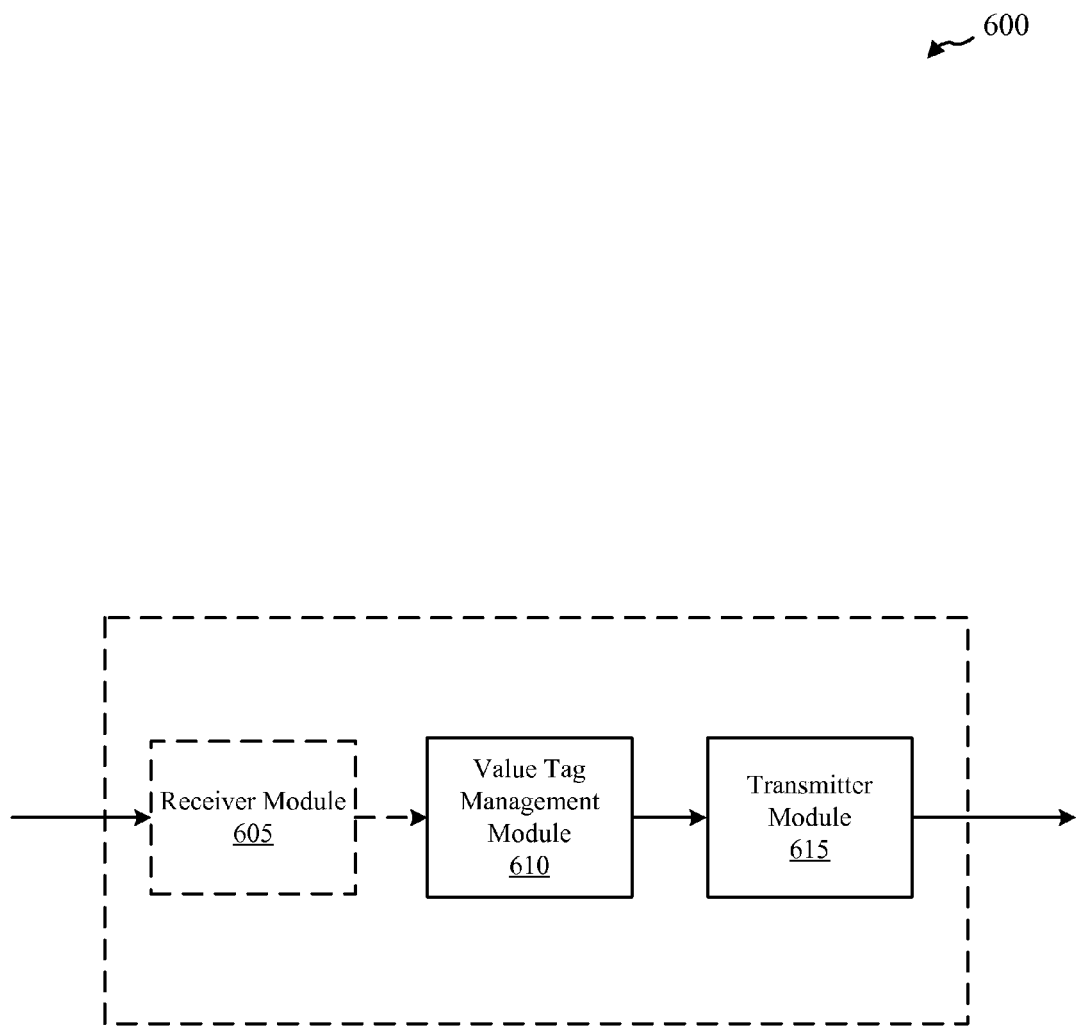
FIG. 6A shows a block diagram of a base station that includes value tag processing functionality in accordance with various embodiments.

Turning next to FIG. 6A a block diagram illustrates a device 600 configured for acquiring and/or managing system information by providing expedited system information (SI) acquisition latency for a UE, such as UE 115-*a*/115-*b*/115-*c*/115-*d* by utilizing a differential value tag in addition to a normal value tag to indicate a change in a system information block (SIB) with respect to a corresponding SIB in the cell on another frequency, in accordance with various embodiments. The device 600 and/or one or more of the modules of device 600 may be an example of aspects of a UE 115 of FIG. 1, FIG. 2, FIG. 3, and/or FIG. 4, base station 105 of FIG. 1, FIG. 2, FIG. 3, and/or FIG. 4, and/or core network/controller 130/120 of FIG. 1, and/or FIG. 3, including all the functionality described therein. The device 600 may also be a processor. The device 600 may include a receiver module 605, a value tag management module 610, and/or a transmitter module 615. Each of these components may be in communication with each other.

These components of the device 600 may, individually or collectively, be implemented with one or more application-specific integrated circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

The receiver module 605 may receive information such as packet, data, and/or signaling information regarding what device 600 has received or transmitted. The received information may be utilized by the value tag management module 610 for a variety of purposes.

In some embodiments, value tag management module 610 may be configured to acquire and/or manage system information, such as by expediting system information (SI) acquisition latency for a user equipment (UE) on a first carrier that has already read system information on a second bandwidth carrier, by utilizing a cross-carrier value tag in addition to one or more normal value tags.

In some embodiments, these methods may include receiver module 605 receiving, and value tag management module 610 identifying a first value of a value tag for a first carrier, wherein the first value of the value tag is linked with at least one system information block (SIB) transmitted over the first carrier. The value tag management module 610 may further determine a second value of the value tag for a second carrier, wherein the second value of the value tag indicates with respect to the first value of the value tag whether the SIBs transmitted over the first carrier are to be utilized with respect to the second carrier. Transmitter module 615 may then transmit an indication of whether the read SIB with respect to the first carrier is going to be used with respect to the second carrier. This may include transmitting the second value of the value tag over the second carrier.

In some embodiments, the value tag management module 610 may determine that the first value of the value tag for the first carrier equals the second value of the value tag for the second carrier. This may indicate that the SIBs transmitted over the first carrier may be utilized with respect to the second carrier. In some cases, the value tag management module 610 may determine that the first value of the value tag for the first carrier differs from the second value of the value tag for the second carrier. This may indicate that another SIB must be read with respect to the second carrier.

In some embodiments, the transmitter module 615 may broadcast the second value of the value tag over the second carrier. In some cases, the transmitter module 615 may be located at a base station 105. In some embodiments, the receiver module 605 may receive the first value of the value tag over the first carrier. In some cases, the receiver module 605 may be located at a base station 105, which may be the same base station 105 where the transmitter module 615 is located. In some embodiments, the identifying and the determining by the value tag management module 610 may occur at a controller 120, such as an RNC, or at a base station 105. In other embodiments, the value tag management module 610 may be implemented as various modules located at different network entities. For example, the identifying may occur at a first base station and the determining may occur at a second base station. In yet other embodiments, the identifying may occur at a first base station and the determining may occur at a Radio Network Controller (RNC), such as controller 120. The value tag management module 610, in general, may be implemented by a Radio Access Network (RAN).

In some cases, the value tag management module 610 may further synchronize one or more values of the value tag with respect to the first carrier and the second carrier. In other embodiments, the value tag management module 610 may be implemented as various modules located at different network entities. For example, the synchronizing may occur at least at a first base station, a second base station, a controller 120, or a core network device 130.

In some embodiments, the value tag management module 610 may further reduce a frequency of SIB scheduling based on utilizing the value tag. In some cases, the value tag management module 610 may further utilize one or more offsets to determine one or more values in the SIB for the second carrier with respect to the read SIB for the first carrier.

In some embodiments, the value tag utilized by the value tag management module 610 may further include a differential value tag to indicate whether a change of the SIB between the first carrier and the second carrier has occurred.

In further embodiments, the value tag utilized by the value tag management module 610 may further include a major value tag portion and a minor value tag portion. The major value tag portion may be utilized to indicate when the read SIB with respect to the first carrier is to be utilized with respect to the second carrier. The minor value tag portion may be utilized to indicate a change of a SIB for the second carrier with respect to a read SIB for the second carrier.

In some embodiments, the first carrier is a normal bandwidth carrier and the second carrier is a flexible bandwidth carrier. In some cases, the first carrier may comprise a flexible bandwidth carrier and the second carrier may comprise a normal bandwidth carrier. In other cases, the first carrier may comprise a first flexible bandwidth carrier and the second carrier may comprise a second flexible bandwidth carrier. In yet other cases, the first carrier may comprise a first normal bandwidth carrier and the second carrier may comprise a second normal bandwidth carrier.

Figure 6B:
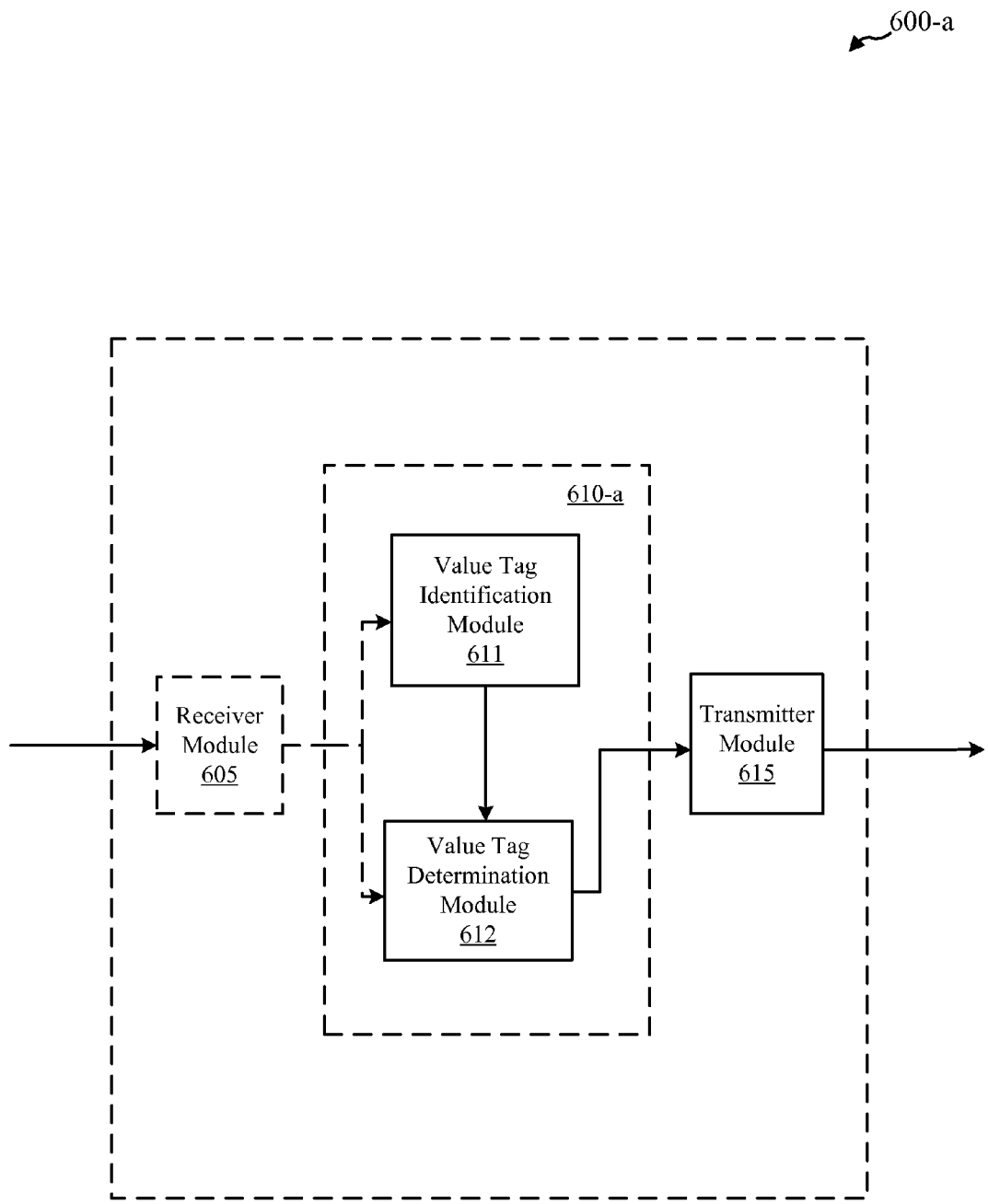
FIG. 6B shows a block diagram of a base station that includes value tag processing functionality in accordance with various embodiments.

Turning next to FIG. 6B, a block diagram illustrates a device 600-*a* that includes system information management functionality in accordance with various embodiments. The device 600-*a* and/or one or more of the modules of device 600-*a* may be an example of aspects of: UE 115 of FIG. 1, FIG. 2, FIG. 3, and/or FIG. 4, base station 105 of FIG. 1, FIG. 2, FIG. 3, and/or FIG. 4, and/or core network/controller 130/120 of FIG. 1, and/or FIG. 3, including all the functionality described therein. The device 600-*a* may also be a processor. The device 600-*a* may include a receiver module 605, a value tag management module 610-*a*, which may further include a value tag identification module 611 and a value tag determination module 612, and/or a transmitter module 615. Each of these components may be in communication with each other.

These components of the device 600-*a* may, individually or collectively, be implemented with one or more application-specific integrated circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

The receiver module 605 may receive information such as packet, data, and/or signaling information regarding what device 600-*a* has received or transmitted. The received information may be utilized by the value tag identification module 611 and the value tag determination module 612 to receive and process SIB information from a first carrier and value tag information from a first and second carrier to reduce SI acquisition latency, in accordance with the various embodiments disclosed herein.

For example, receiver module 605 may receive information including a first value of a value tag in a first carrier and at least one SIB transmitted over the first carrier linked with the first value of the value tag. The receiver module 605 may communication this information to the value tag identification module 611 and the value tag determination module 612. The value tag identification module 611 may identify the first value of the value tag for the first carrier, the first value being linked with at least one SIB transmitted over the first carrier. The value tag identification module 611 may communicate this information to the value tag determination module 612. The value tag determination module 612 may then determine a second value of the value tag for a second carrier, wherein the second value of the value tag indicates with respect to the first value of the value tag whether the at least one SIB transmitted over the first carrier may be utilized with respect to the second carrier. The value tag determination module may communicate the second value of the value tag to the transmitter module 615. The transmitter module may transmit the second value of the value tag to the appropriate network entity, such as a UE 115, another base station 105, etc. In some embodiments, the transmitter module 615 may broadcast the second value of the value tag over the second carrier.

In some embodiments, different aspects of systems 100, 200-*a*, 200-*b*, 300, and/or 400 such as the UE 115, the base stations 105, the core network 130, and/or the controller 120 may be configured for reducing SI acquisition latency for a UE by utilizing a differential value tag as described above with reference to FIG. 6B.

Figure 7:
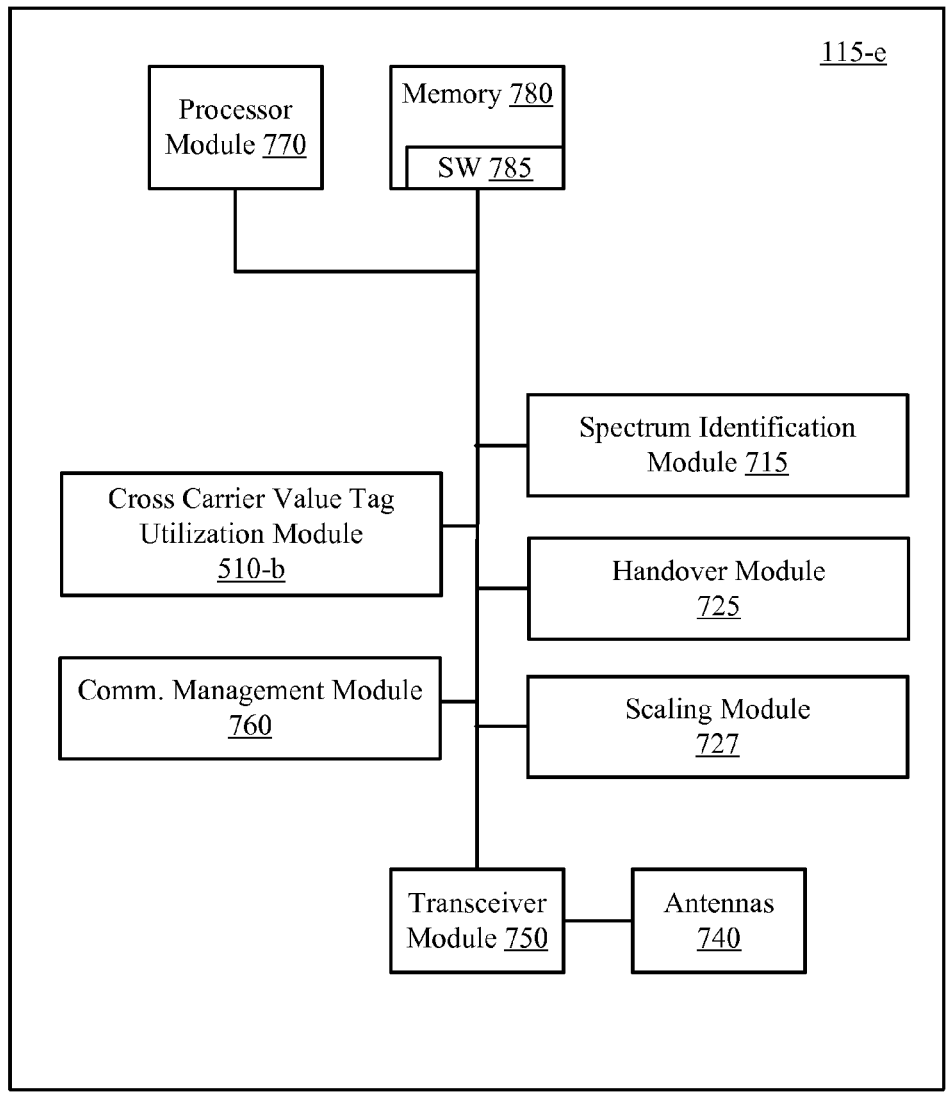
FIG. 7 shows a block diagram of a user equipment configured for value tag processing in accordance with various embodiments.

FIG. 7 is a block diagram 700 of a user equipment (UE) 115-*e* configured for system information acquisition and/or management in accordance with various embodiments. The UE 115-*e* may have any of various configurations, such as personal computers (e.g., laptop computers, netbook computers, tablet computers, etc.), cellular telephones, PDAs, digital video recorders (DVRs), internet appliances, gaming consoles, e-readers, etc. The UE 115-*e* may have an internal power supply (not shown), such as a small battery, to facilitate mobile operation. In some embodiments, the user equipment 115-*e* may be the UE 115 of FIG. 1, FIG. 2, FIG. 3, and/or FIG. 4, and/or the device 500 of FIG. 5A or the device 500-*a* of FIG. 5B. The UE 115-*e* may be a multi-mode UE. The UE 115-*e* may be referred to as a wireless communications device in some cases.

The UE 115-*e* may include antennas 740, a transceiver module 750, memory 780, and a processor module 770, which each may be in communication, directly or indirectly, with each other (e.g., via one or more buses). The transceiver module 750 may be configured to communicate bi-directionally, via the antennas 740 and/or one or more wired or wireless links, with one or more networks, as described above. For example, the transceiver module 750 may be configured to communicate bi-directionally with base stations 105 of FIG. 1, FIG. 2, FIG. 3, and/or FIG. 4, and/or core network/controller 130/120 of FIG. 1, and/or FIG. 3. The transceiver module 750 may include a modem configured to modulate the packets and provide the modulated packets to the antennas 740 for transmission, and to demodulate packets received from the antennas 740. While the UE 115-*e* may include a single antenna, the UE 115-*e* will typically include multiple antennas 740 for multiple links.

The memory 780 may include random access memory (RAM) and read-only memory (ROM). The memory 780 may store computer-readable, computer-executable software code 785 containing instructions that are configured to, when executed, cause the processor module 770 to perform various functions described herein (e.g., expediting system information acquisition and management latency, etc.). Alternatively, the software 785 may not be directly executable by the processor module 770 but be configured to cause the computer (e.g., when compiled and executed) to perform functions described herein.

The processor module 770 may include an intelligent hardware device, e.g., a central processing unit (CPU) such as those made by Intel® Corporation or AMD®, a microcontroller, an application-specific integrated circuit (ASIC), etc. The processor module 770 may include a speech encoder (not shown) configured to receive audio via a microphone, convert the audio into packets (e.g., 20 ms in length) representative of the received audio, provide the audio packets to the transceiver module 750, and provide indications of whether a user is speaking. Alternatively, an encoder may only provide packets to the transceiver module 750, with the provision or withholding/suppression of the packet itself providing the indication of whether a user is speaking. The processor module 770 may also include a speech decoder that may perform a reverse functionality as the speech encoder.

According to the architecture of FIG. 7, the user equipment 115-*e* may further include a communications management module 760. The communications management module 760 may manage communications with other UEs 115. By way of example, the communications management module 760 may be a component of the UE 115-*e* in communication with some or all of the other components of the UE 115-*e* via a bus. Alternatively, functionality of the communications management module 760 may be implemented as a component of the transceiver module 750, as a computer program product, and/or as one or more controller elements of the processor module 770.

The components for user equipment 115-1 may be configured to implement aspects discussed above with respect to systems 100, 200-*a*, 200-*b*, 300, 400 and devices 500 and 500-*a* of FIGS. 5A and 5B, respectively, and may not be repeated here for the sake of brevity. Cross-carrier value tag utilization module 510-*b* may be an example of the value tag utilization module 510 and/or 510-*a* of FIGS. 5A and 5B.

The UE 115-*e* may also include a spectrum identification module 715. The spectrum identification module 715 may be utilized to identify spectrum available for flexible bandwidth waveforms. In some embodiments, a handover module 725 may be utilized to perform handover procedures of the UE 115-*e* from one base station to another. For example, the handover module 725 may perform a handover procedure of the UE 115-*e* from one base station to another where normal waveforms are utilized between the UE 115-*e* and one of the base stations and flexible bandwidth waveforms are utilized between the UE 115-*e* and another base station. A scaling module 727 may be utilized to scale and/or alter chip rates to generate/decode flexible bandwidth waveforms.

In some embodiments, the transceiver module 750, in conjunction with antennas 740, along with other possible components of UE 115-*e*, may transmit information regarding flexible bandwidth waveforms and/or scaling factors from the UE 115-*e* to base stations or a core network/controller. In some embodiments, the transceiver module 750, in conjunction with antennas 740, along with other possible components of UE 115-*e*, may transmit/receive information, such flexible bandwidth waveforms and/or scaling factors, to/from base stations or a core network/controller such that these devices or systems may utilize flexible bandwidth waveforms.

Figure 8:
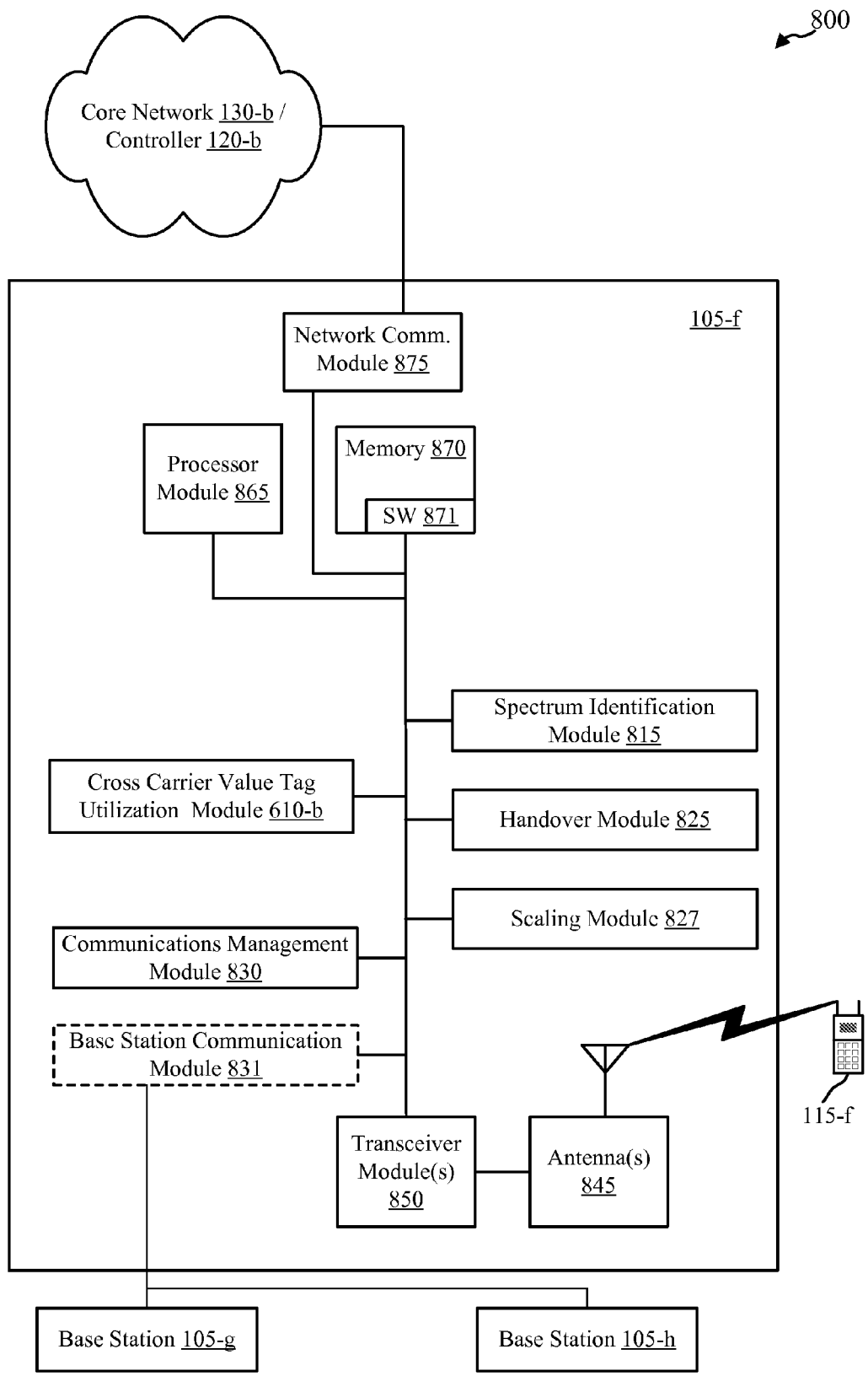
FIG. 8 shows a block diagram of a communications system configured for providing SIB/value tag processing for wireless communications systems in accordance with various embodiments.

FIG. 8 shows a block diagram of a communications system 800 that may be configured for system information acquisition and/or management in accordance with various embodiments. This system 800 may include aspects of the system 100 depicted in FIG. 1, systems 200 of FIG. 2, systems 300 of FIG. 3, and/or system 400 of FIG. 2, and/or device 500 of FIG. 5A, device 500-*a* of FIG. 5B, device 600 of FIG. 600-*a*, and/or device 600-*a* of FIG. 6B. The base station 105-*f* may include aspects of a base station 105 and may be configured to communicate bi-directionally with one or more core networks 130-*b* and/or a controllers 120-*b* via network communication module 875, the transceiver module 850, and/or other components of the base station 105-*f*. In some embodiments, base station 105-*f* may include a cross carrier value tag utilization module 610-*b* with system information acquisition and/or management functionality as described above. In some embodiments, aspects of the core network 130-*b* and/or the controller 120-*b* may be incorporated into base station 105-*f*. Furthermore, in alternative embodiments, such as when system information acquisition and/or management functionality may be implemented in system 800 via a controller 120-*b*, for example a Radio Network Controller (RNC), or a Radio Access Network (RAN) in general, the cross carrier value tag utilization module 610-*b* may be located at the controller 120 and/or somewhere within the RAN.

The base station 105-*f* may include antennas 845, a transceiver module 850, memory 870, and a processor module 865, which each may be in communication, directly or indirectly, with each other (e.g., over one or more buses). The transceiver module 850 may be configured to communicate bi-directionally, via the antennas 845, with a user equipment (UE) 115-*f*, which may be a multi-mode UE. The base station 105-*f* may be an example of an eNodeB base station, a Home eNodeB base station, a NodeB base station, a Radio Network Controller (RNC), and/or a Home NodeB base station.

Base station 105-*f* may also communicate with other base stations 105, such as base station 105-*g* and base station 105-*h*. Each of the base stations 105 may communicate with UE 115-*f* using different wireless communications technologies, such as different Radio Access Technologies (RATs). In some cases, base station 105-*f* may communicate with other base stations such as 105-*g* and/or 105-*h* utilizing base station communication module 831. In some embodiments, base station communication module 831 may provide an X2 interface within an LTE wireless communication technology to provide communication between some of the base stations 105. In some embodiments, base station 105-*f* may communicate with other base stations through controller 120-*b* and/or core network 130-*b*.

The memory 870 may include random access memory (RAM) and read-only memory (ROM). The memory 870 may also store computer-readable, computer-executable software code 871 containing instructions that are configured to, when executed, cause the processor module 865 to perform various functions described herein (e.g., expediting system information acquisition and management latency, etc.). Alternatively, the software 871 may not be directly executable by the processor module 865 but be configured to cause the computer, e.g., when compiled and executed, to perform functions described herein.

The processor module 865 may include an intelligent hardware device, e.g., a central processing unit (CPU) such as those made by Intel® Corporation or AMD®, a microcontroller, an application-specific integrated circuit (ASIC), etc. The processor module 865 may include a speech encoder (not shown) configured to receive audio via a microphone, convert the audio into packets (e.g., 20 ms in length) representative of the received audio, provide the audio packets, and/or provide indications of whether a user is speaking.

The transceiver module 850 may include a modem configured to modulate the packets and provide the modulated packets to the antennas 845 for transmission, and to demodulate packets received from the antennas 845. While some examples of base station 105-*f* may include a single antenna 845, the base station 105-*f* preferably includes multiple antennas 845 for multiple links which may support carrier aggregation. For example, one or more links may be used to support macro communications with UE 115-*e*.

According to the architecture of FIG. 8, the base station 105-*f* may further include a communications management module 830. The communications management module 830 may manage communications with other base stations 105 or controller 120-*b*. By way of example, the communications management module 830 may be a component of the base station 105-*f* in communication with some or all of the other components of the base station 105-*f* via a bus. Alternatively, functionality of the communications management module 830 may be implemented as a component of the transceiver module 850, as a computer program product, and/or as one or more controller elements of the processor module 865.

The components for base station 105-*f* may be configured to implement aspects discussed above with respect to systems 100, 200-*a*, 200-*b*, 300, 400 and devices 600 and 600-*a* of FIG. 6A, and FIG. 6B, respectively and may not be repeated here for the sake of brevity. The cross-carrier value tag utilization module 610-*b* may be an example of the value tag management module 610 of FIG. 6A and/or 610-*a* of FIG. 6B.

The base station 105-*f* may also include a spectrum identification module 815. The spectrum identification module 815 may be utilized to identify spectrum available for flexible bandwidth waveforms. In some embodiments, a handover module 825 may be utilized to perform handover procedures of the UE 115-*f* from one base station 105 to another. For example, the handover module 825 may perform a handover procedure of UE 115-*f* from the base station 105-*f* to another base station 105, such as 105-*g* or 105-*h*, where normal waveforms are utilized between the UE 115-*f* and one of the base stations 105-*g* and flexible bandwidth waveforms are utilized between the UE 115-*f* and another base station 105-*h*. A scaling module 827 may be utilized to scale and/or alter chip rates to generate flexible bandwidth waveforms.

In some embodiments, the transceiver module 850 in conjunction with antennas 845, along with other possible components of the base station 105-*f*, may transmit and/or receive information regarding flexible bandwidth waveforms and/or scaling factors from the base station 105-*f* to the UE 115-*f*, to other base stations 105-*g*/105-*h*, or core network 130-*b*/controller 120-*b*. In some embodiments, the transceiver module 850 in conjunction with antennas 845, along with other possible components of the base station 105-*f*, may transmit and/or receive information to or from the UE 115-*f*, to or from other base stations 105-*g*/105-*h*, or core network 130-*b*/controller 120-*b*, such as flexible bandwidth waveforms and/or scaling factors, such that these devices or systems may utilize flexible bandwidth waveforms.

Figure 9:
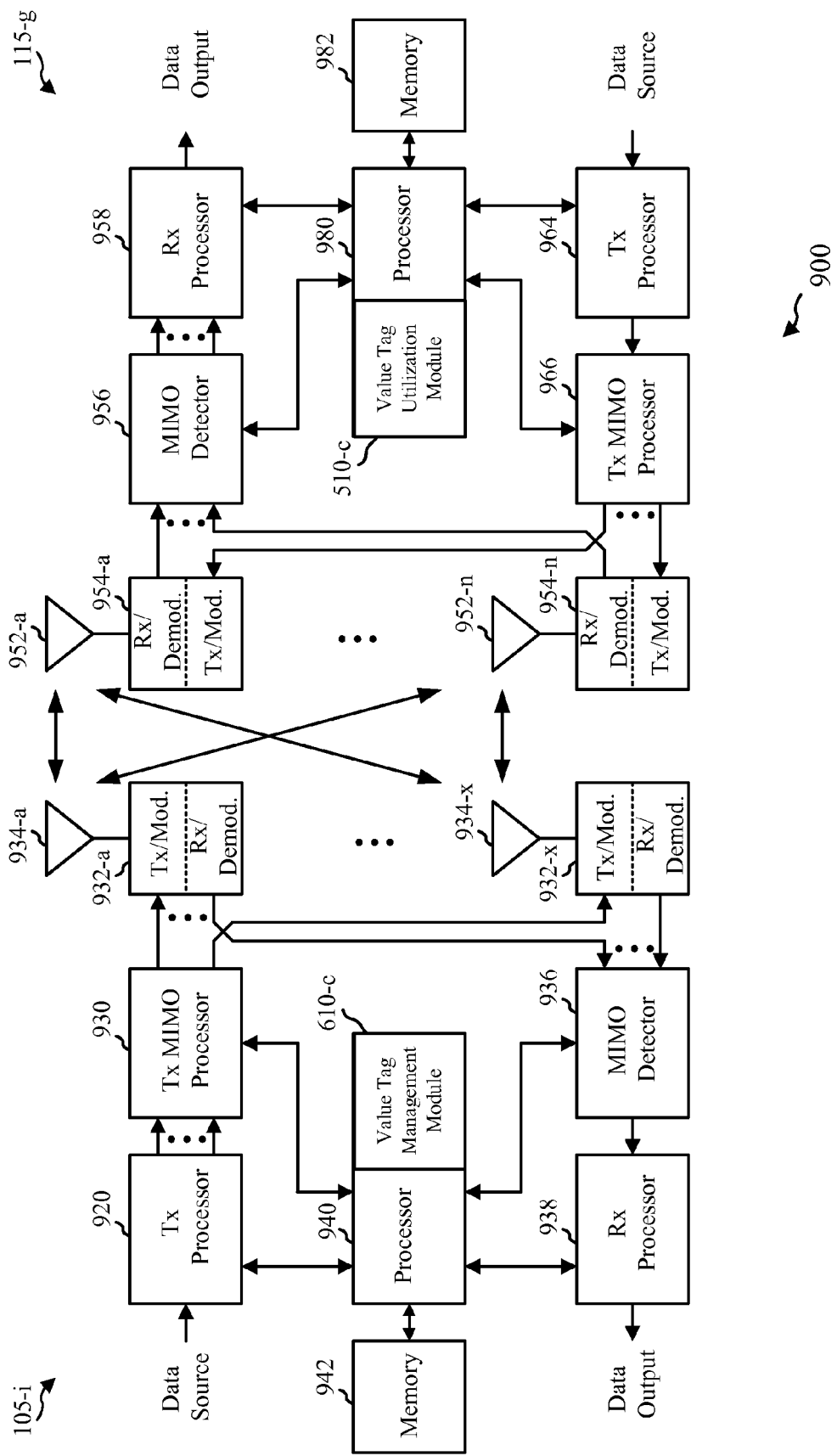
FIG. 9 shows a block diagram of a wireless communications system that includes a base station and a user equipment in accordance with various embodiments.

FIG. 9 is a block diagram of a system 900 including a base station 105-*i* and a user equipment (UE) 115-*g* in accordance with various embodiments. This system 900 may be an example of the system 100 of FIG. 1, system 200 of FIG. 2, system 300 of FIG. 3, system 400 of FIG. 4, and/or system 800 of FIG. 8, and/or may include aspects of device 500 of FIG. 5A, device 500-*a* of FIG. 5B, device 600 of FIG. 6A, device 600-*a* of FIG. 6B, and or device 700 of FIG. 7. The base station 105-*i* may be equipped with antennas 934-*a* through 934-*x*, and the user equipment 115-*g* may be equipped with antennas 952-*a* through 952-*n*. At the base station 105-*i*, a transmit processor 920 may receive data from a data source.

The transmit processor 920 may process the data. The transmit processor 920 may also generate reference symbols, and a cell-specific reference signal. A transmit (TX) MIMO processor 930 may perform spatial processing (e.g., precoding) on data symbols, control symbols, and/or reference symbols, if applicable, and may provide output symbol streams to the transmit modulators 932-*a* through 932-*x*. Each modulator 932 may process a respective output symbol stream (e.g., for OFDM, etc.) to obtain an output sample stream. Each modulator 932 may further process (e.g., convert to analog, amplify, filter, and upconvert) the output sample stream to obtain a downlink (DL) signal. In one example, DL signals from modulators 932-*a* through 932-*x* may be transmitted via the antennas 934-*a* through 934-*x*, respectively. The transmit processor 920 may receive information from a processor 940. The processor 940 may be coupled with a memory 942. The processor 940 may be configured to generate flexible bandwidth waveforms through altering a chip rate and/or utilizing a scaling factor. In some embodiments, the processor module 940 may be configured for dynamically adapting flexible bandwidth in accordance with various embodiments. The processor 940 may dynamically adjust one or more scale factors of the flexible bandwidth signal associated with transmissions between base station 105-*i* and user equipment 115-*g*. These adjustments may be made based on information such as traffic patterns, interference measurements, etc.

For example, within system 900, the processor 940 may further include value tag management module 610-*c* configured to implement aspects discussed above with respect to systems 100, 200-*a*, 200-*b*, 300, 400, and 800 and devices 600 and 600-*a* of FIG. 6A, and FIG. 6B, respectively, and may not be repeated here for the sake of brevity. The value tag management module 610-*c* may be an example of the value tag management module 610 of FIG. 6A, 610-*a* of FIG. 6B, and/or the cross-carrier value tag utilization module 610-*b* of FIG. 8.

At the user equipment 115-*g*, the user equipment antennas 952-*a* through 952-*n* may receive the DL signals from the base station 105-*i* and may provide the received signals to the demodulators 954-*a* through 954-*n*, respectively. Each demodulator 954 may condition (e.g., filter, amplify, downconvert, and digitize) a respective received signal to obtain input samples. Each demodulator 954 may further process the input samples (e.g., for OFDM, etc.) to obtain received symbols. A MIMO detector 956 may obtain received symbols from all the demodulators 954-*a* through 954-*n*, perform MIMO detection on the received symbols, if applicable, and provide detected symbols. A receive processor 958 may process (e.g., demodulate, deinterleave, and decode) the detected symbols, providing decoded data for the user equipment 115-*g* to a data output, and provide decoded control information to a processor 980, or memory 982.

On the uplink (UL) or reverse link, at the user equipment 115-*g*, a transmit processor 964 may receive and process data from a data source. The transmitter processor 964 may also generate reference symbols for a reference signal. The symbols from the transmit processor 964 may be precoded by a transmit MIMO processor 966, if applicable, further processed by the demodulators 954-*a* through 954-*n* (e.g., for SC-FDMA, etc.), and be transmitted to the base station 105-*i* in accordance with the transmission parameters received from the base station 105-*i*. The transmit processor 964 may also be configured to generate flexible bandwidth waveforms through altering a chip rate and/or utilizing a scaling factor; this may be done dynamically in some cases. The transmit processor 964 may receive information from processor 980. The processor 980 may provide for different alignment and/or offsetting procedures. The processor 980 may also utilize scaling and/or chip rate information to perform measurements on the other subsystems, perform handoffs to the other subsystems, perform reselection, etc. The processor 980 may invert the effects of time stretching associated with the use of flexible bandwidth through parameter scaling. At the base station 105-*i*, the UL signals from the user equipment 115-*g* may be received by the antennas 934, processed by the demodulators 932, detected by a MIMO detector 936, if applicable, and further processed by a receive processor 938. The receive processor 938 may provide decoded data to a data output and to the processor 940. In some embodiments, the processor 940 may be implemented as part of a general processor, the transmit processor 920, and/or the receiver processor 938.

In some embodiments, the processor module 980 may be configured for dynamically adapting flexible bandwidth in accordance with various embodiments. The processor 980 may dynamically adjust one or more scale factors of the flexible bandwidth signal associated with transmissions between base station 105-*i* and user equipment 115-*g*. These adjustments may be made based on information such as traffic patterns, interference measurements, etc.

For example, within system 900, the processor 980 may be configured to implement aspects discussed above with respect to systems 100, 200-*a*, 200-*b*, 300, 400, and 700 and devices 500 and 500-*a* of FIGS. 5A and 5B, respectively, and may not be repeated here for the sake of brevity. The value tag utilization module 510-*c* may be an example of the value tag utilization module 510 of FIG. 5A, 510-*a* of FIG. 5B, and/or the cross-carrier value tag utilization module 510-*b* of FIG. 7. Furthermore, in alternative embodiments, such as when system information acquisition and/or management functionality may be implemented in system 900 via a controller 120, for example a Radio Network Controller (RNC), the value tag management module 610-*c* and/or the value tag utilization module 510-*c* may be located at the controller 120. A Radio Access Network (RAN) in general may be utilized to implement aspects of system 900.

Figure 10A:
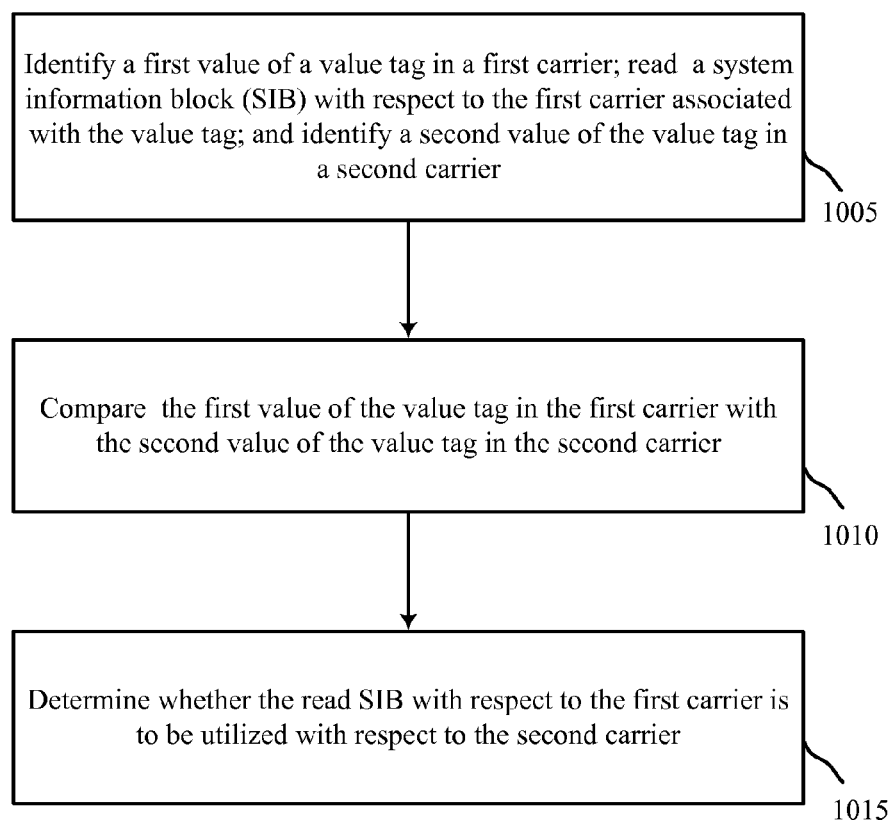
FIG. 10A shows a flow diagram of a method for providing value tag processing at a user equipment within wireless communications systems in accordance with various embodiments.

Turning to FIG. 10A, a flow diagram of a method 1000 for providing system information (SI) in wireless communications. For example, in some cases, method 1000 may provide for expedited SI acquisition latency for a UE 115 by utilizing a differential value tag in addition to a normal value tag to indicate a change in a SIB with respect to a corresponding SIB in the cell on another frequency, within wireless communications systems is provided in accordance with various embodiments. Method 1000 may be implemented utilizing various wireless communications devices, such as UE 115, and/or systems including, but not limited to system 100 of FIG. 1, system 200-*a* of FIG. 2A, system 200-*b* of FIG. 2B, system 300 of FIG. 3, system 400 of FIG. 4, system 700 of FIG. 7, system 900 of FIG. 9, device 500 of FIG. 5A and/or device 500-*a* of FIG. 5B.

At block 1005, a network entity, such as a UE 115 may identify a first value of a value tag in a first carrier. The UE 115 may read a SIB with respect to the first carrier associated with the value tag. The UE 115 may further identify a second value of the value tag in a second carrier. At block 1010, the UE 115 may compare the first value of the value tag in the first carrier with the second value of the value tag in the second carrier. At block 1010, the UE 115 may determine whether the read SIB with respect to the first carrier is to be utilized with respect to the second carrier.

In some embodiments, determining, at the UE, whether the read SIB with respect to the first carrier is to be utilized with respect to the second carrier is based on the comparison of the first value of the value tag in the first carrier with the second value of the value tag in the second carrier.

Some embodiments further include utilizing, with respect to the second carrier, the read SIB with respect to the first carrier based on the comparison of the first value of the value tag in the first carrier with the second value of the value tag in the second carrier. The first value of the value tag in the first carrier may equal the second value of the value tag in the second carrier.

Some embodiments include reading a SIB with respect to the second carrier based on the comparison of the first value of the value tag in the first carrier with the second value of the value tag in the second carrier. The first value of the value tag in the first carrier may differ from the second value of the value tag in the second carrier.

In some embodiments, method 1000 may include the UE 115 operating in an idle mode when comparing the first value of the value tag in the first carrier with the second value of the value tag in the second carrier. In some cases, the UE 115 may operate in a single-carrier mode when comparing the first value of the value tag in the first carrier with the second value of the value tag in the second carrier.

In some embodiments, the value tag of method 1000 may further include a differential value tag to indicate whether a change of the SIB between the first carrier and the second carrier has occurred. In some cases, the UE 115 may utilize one or more offsets to determine one or more values in the SIB for the second carrier with respect to the read SIB for the first carrier.

In further embodiments, the value tag of method 1000 may further comprise a major value tag portion and a minor value tag portion. The major value tag portion may be utilized to indicate when the read SIB with respect to the first carrier is to be utilized with respect to the second carrier. In some cases, the major value tag may also be utilized to indicate a change of one or more SIBs for the second carrier with respect to one or more read SIBs for the second carrier. The minor value tag portion may be utilized to indicate a change of a SIB for the second carrier with respect to a read SIB for the second carrier. In some cases, the minor value tag may also or alternatively be utilized to indicate a change of one or more SIBs for the second carrier with respect to one or more read SIBs for the first carrier.

In some embodiments, in the method 1000, the first carrier is a normal bandwidth carrier and the second carrier is a flexible bandwidth carrier. In some cases, the first carrier may comprise a flexible bandwidth carrier and the second carrier may comprise a normal bandwidth carrier. In other cases, the first carrier may comprise a first flexible bandwidth carrier and the second carrier may comprise a second flexible bandwidth carrier. In yet other cases, the first carrier may comprise a first normal bandwidth carrier and the second carrier may comprise a second normal bandwidth carrier.

Figure 10B:
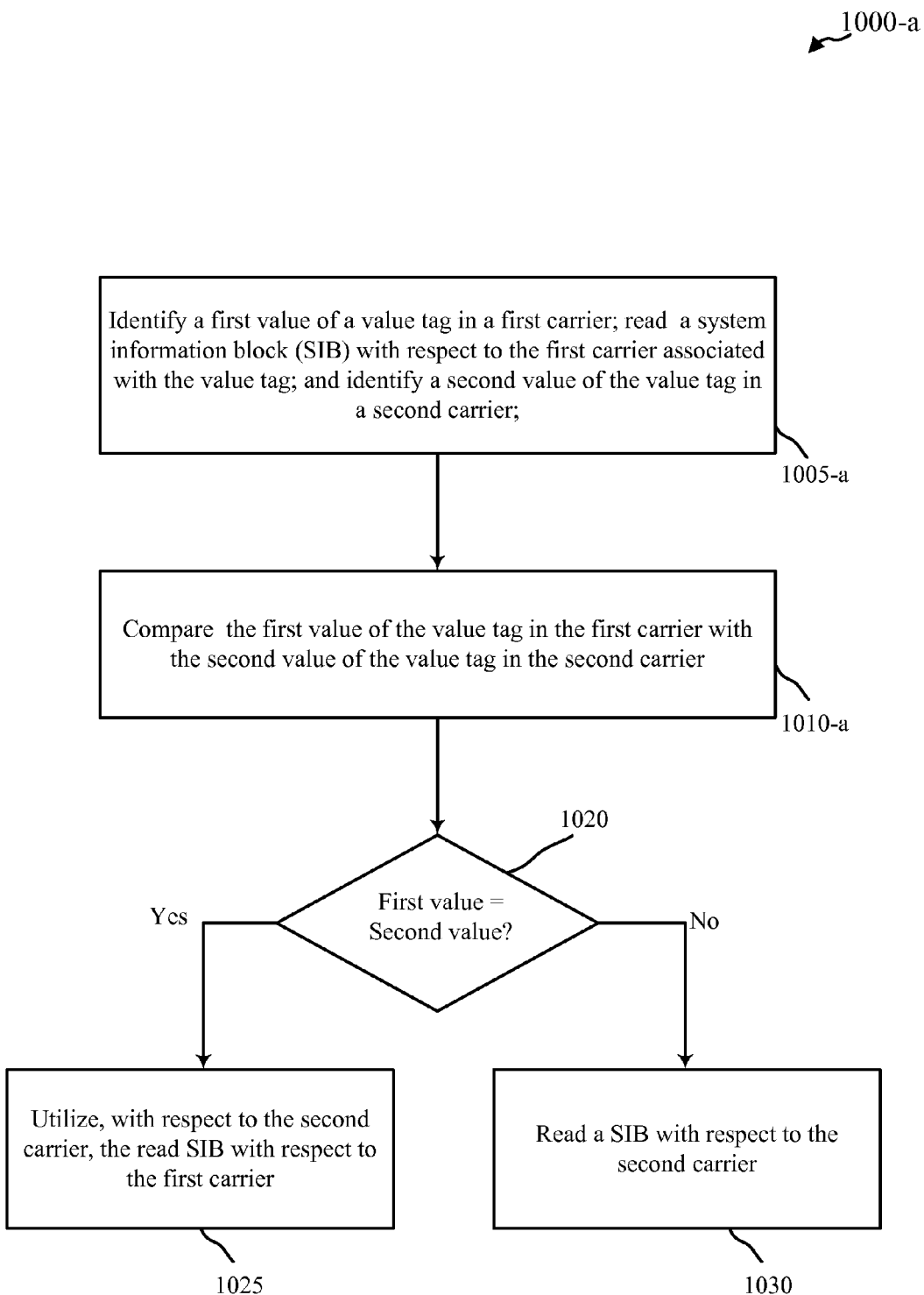
FIG. 10B shows a flow diagram of a method for providing value tag processing at a user equipment within wireless communications systems in accordance with various embodiments.

Turning to FIG. 10B, a flow diagram of a method 1000-*a* for providing system information (SI) in wireless communications. For example, in some cases, method 1000-*a* may provide for expedited system SI acquisition latency for a UE 115 by utilizing a differential value tag in addition to a normal value tag to indicate a change in a SIB with respect to a corresponding SIB in the cell on another frequency, within wireless communications systems is provided in accordance with various embodiments. Method 1000-*b* may be implemented utilizing various wireless communications devices, such as UE 115, and/or systems including, but not limited to system 100 of FIG. 1, system 200 of FIG. 2, system 300 of FIG. 3, system 400 of FIG. 4, system 700 of FIG. 7, system 900 of FIG. 9, device 500 of FIG. 5A and/or device 500-*a* of FIG. 5B. Method 1000-*a* may be an example of one or more aspects of method 1000 of FIG. 10A.

At block 1005-*a*, a network entity, such as a UE 115, may identify a first value of a value tag in a first carrier. The UE 115 may read a SIB with respect to the first carrier associated with the value tag. The UE 115 may further identify a second value of the value tag in a second carrier. At block 1010-*a*, the UE 115 may compare the first value of the value tag in the first carrier with the second value of the value tag in the second carrier. At block 1020, the UE 115 may determine, based on the comparison, whether the first value of the value tag is equal to the second value of the value tag. If the first value of the value tag is equal to the second value of the value tag, at block 1025, the UE 115 may utilize, with respect to the second carrier, the read SIB with respect to the first carrier and forego re-reading the SIB on the second carrier. If the first value of the value tag is different from the second value of the value tag, at block 1030, the UE 115 may read a SIB with respect to the second carrier, as in normal operation.

Figure 11A:
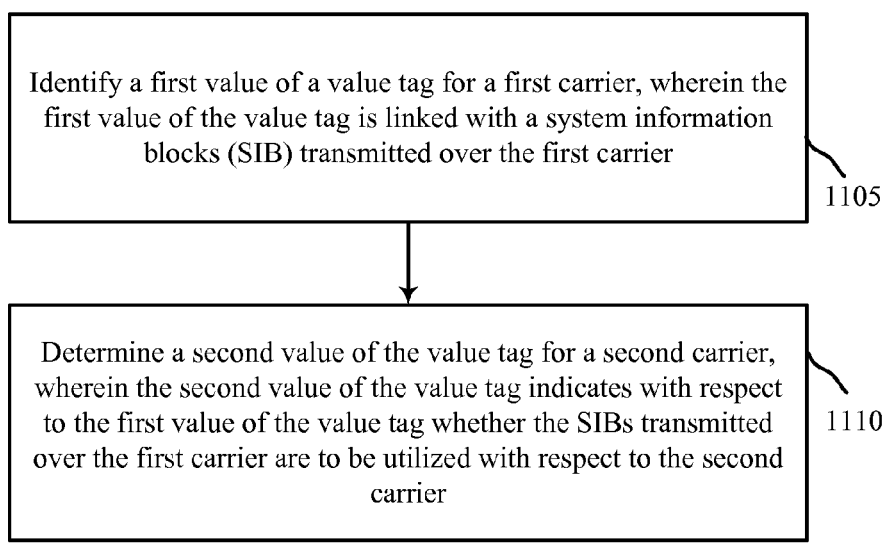
FIG. 11A shows a flow diagram of a method for providing value tag processing at a base station within wireless communications systems in accordance with various embodiments.

Turning to FIG. 11A, a flow diagram of a method 1100 for providing system information (SI) in wireless communications. For example, in some cases, method 1100 may provide for expedited SI acquisition latency for a UE 115 by utilizing a differential value tag in addition to a normal value tag to indicate a change in a SIB with respect to a corresponding SIB in the cell on another frequency, within wireless communications systems is provided in accordance with various embodiments. Method 1100 may be implemented utilizing various wireless communications devices, such as base stations 105, controllers 120, and/or core networks 120, and/or systems including, but not limited to system 100 of FIG. 1, system 200 of FIG. 2, system 300 of FIG. 3, system 400 of FIG. 4, system 800 of FIG. 8, system 900 of FIG. 9, device 600 of FIG. 6A and/or device 600-*a* of FIG. 6B.

The method 1100 may include, at block 1105, identifying a first value of a value tag for a first carrier, wherein the first value of the value tag is linked with a SIB transmitted over the first carrier. At block 1110, the method 1100 may include determining a second value of the value tag for a second carrier, wherein the second value of the value tag indicates with respect to the first value of the value tag whether the SIB transmitted over the first carrier may be utilized with respect to the second carrier.

In some embodiments of the method 1100, the first value of the value tag for the first carrier may equal the second value of the value tag for the second carrier. This may indicate that the SIB transmitted over the first carrier may be utilized with respect to the second carrier. In some cases, the first value of the value tag for the first carrier may differ from the second value of the value tag for the second carrier. This may indicate that another SIB must be read with respect to the second carrier.

In some embodiments, the method 1100 may further include broadcasting, from a base station, such as base station 105, the second value of the value tag over the second carrier. In some cases, the method 1100 may include receiving, at the base station 105, the first value of the value tag. In some embodiments, the identifying and the determining of method 1100 may occur at a base station 105. In other embodiments, the identifying may occur at a first base station and the determining may occur at a second base station. In yet other embodiments, the identifying may occur at a first base station and the determining may occur at a Radio Network Controller (RNC), such as controller 120. In general, identifying the first value of the value tag for the first carrier and/or determining the second value of the value tag for the second carrier may be performed at a Radio Access Network (RAN).

In some cases, the method 1100 may include synchronizing one or more values of the value tag with respect to the first carrier and the second carrier. In some cases, the synchronizing may occur at least at a first base station, a second base station, a controller 120, or a core network device 130.

In some embodiments, the method 1100 may further include reducing a frequency of SIB scheduling based on utilizing the value tag. In some cases, the method 1100 may further include utilizing one or more offsets to determine one or more values in the SIB for the second carrier with respect to the read SIB for the first carrier.

In some embodiments, the value tag of method 1100 may further include a differential value tag to indicate whether a change of the SIB between the first carrier and the second carrier has occurred.

In further embodiments, the value tag of method 1100 may further comprise a major value tag portion and a minor value tag portion. The major value tag portion may be utilized to indicate when the read SIB with respect to the first carrier is to be utilized with respect to the second carrier. The minor value tag portion may be utilized to indicate a change of a SIB for the second carrier with respect to a read SIB for the second carrier.

In some embodiments, in the method 1100, the first carrier is a normal bandwidth carrier and the second carrier is a flexible bandwidth carrier. In some cases, the first carrier may comprise a flexible bandwidth carrier and the second carrier may comprise a normal bandwidth carrier. In other cases, the first carrier may comprise a first flexible bandwidth carrier and the second carrier may comprise a second flexible bandwidth carrier. In yet other cases, the first carrier may comprise a first normal bandwidth carrier and the second carrier may comprise a second normal bandwidth carrier.

Figure 11B:
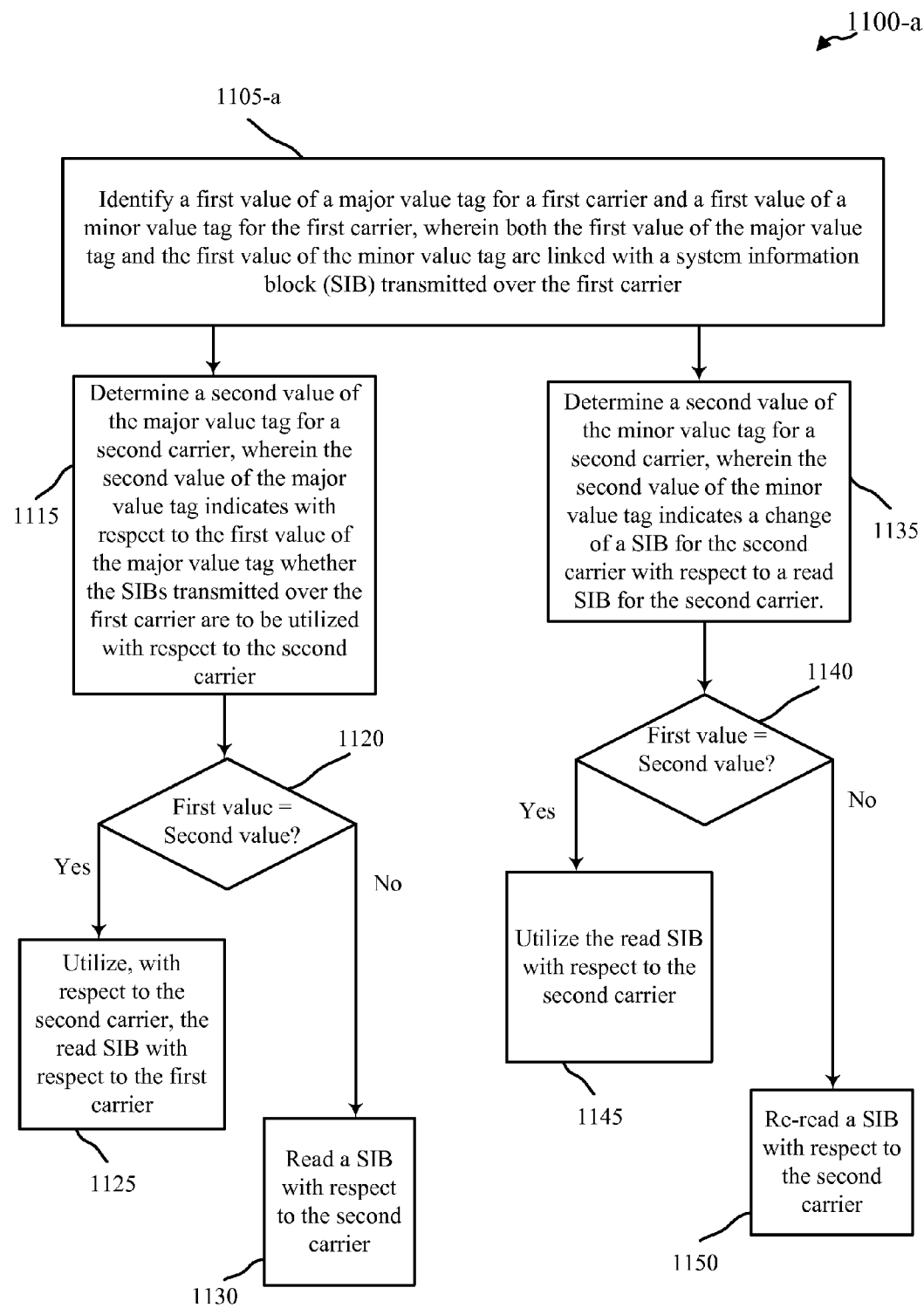
FIG. 11B shows a flow diagram of a method for providing value tag processing at a base station within wireless communications systems in accordance with various embodiments.

Turning to FIG. 11B, a flow diagram of a method 1100-s for providing system information (SI) in wireless communications. For example, in some cases, method 1100-a may provide for expedited SI acquisition latency for a UE 115 by utilizing a differential value tag in addition to a normal value tag to indicate a change in a SIB with respect to a corresponding SIB in the cell on another frequency, within wireless communications systems is provided in accordance with various embodiments. Method 1100-a may be implemented utilizing various wireless communications devices, such as base stations 105, controllers 120, and/or core networks 130, and/or systems including, but not limited to system 100 of FIG. 1, system 200 of FIG. 2, system 300 of FIG. 3, system 400 of FIG. 4, system 800 of FIG. 8, system 900 of FIG. 9, device 600 of FIG. 6A and/or device 600-a of FIG. 6B. Method 1100-a may be an example of one or more aspects of method 1100 of FIG. 11A.

The method 1100-a may include at block 1105, identifying, for example by a base station 105, a first value of a major value tag for a first carrier and a first value of a minor value tag for the first carrier, wherein both the first value of the major value tag and the first value of the minor value tag are linked with a SIB transmitted over the first carrier. The method 1100-a may be performed at various network entities, such as a UE 115, a base station 105, multiple base stations 105, a controller 120, a core network 130, or any combination thereof. For the sake of explanation, method 1100-a will be described as being performed by a base station; however the claimed subject matter is not so limited.

At block 1115, the base station 105 may determine a second value of the major value tag for a second carrier, wherein the second value of the major value tag indicates with respect to the first value of the major value tag whether the SIBs transmitted over the first carrier are to be utilized with respect to the second carrier. If the first value of the major value tag is equal to the second value of the major value tag at block 1120, the base station 105 may utilize, with respect to the second carrier, the read SIB with respect to the first carrier and forego re-reading the SIB on the second carrier. If the first value of the major value tag is different from the second value of the major value tag at block 1120, the base station 105 may read a SIB with respect to the second carrier, as in normal operation.

At block 1135, the base station 105 may determine a second value of the minor value tag for a second carrier, wherein the second value of the minor value tag indicates a change of a SIB for the second carrier with respect to a read SIB for the second carrier. If the first value of the minor value tag is equal to the second value of the minor value tag at block 1140, the base station 105 may utilize the read SIB with respect to the second carrier, and forego re-reading the SIB on the second carrier, or postpone re-reading the SIB until a later time. If the first value of the minor value tag is different from the second value of the minor value tag at block 1140, the base station 105 may re-read a SIB with respect to the second carrier, as in normal operation.

According to some embodiments, the base station 105 may perform the steps of blocks 1115 and 1135 concurrently; however, given limited resources, the base station 105 may perform the step of block 1115, and upon the completion of the related steps, may then proceed to perform the step of block 1135 and the step associated thereof.

The detailed description set forth above in connection with the appended drawings describes exemplary embodiments and does not represent the only embodiments that may be implemented or that are within the scope of the claims. The term "exemplary" used throughout this description means "serving as an example, instance, or illustration," and not "preferred" or "advantageous over other embodiments." The detailed description includes specific details for the purpose of providing an understanding of the described techniques. These techniques, however, may be practiced without these specific details. In some instances, well-known structures and devices are shown in block diagram form in order to avoid obscuring the concepts of the described embodiments.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of indicates a disjunctive list such that, for example, a list of "at least one of" A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general-purpose or special-purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the spirit or scope of the disclosure. Throughout this disclosure the term "example" or "exemplary" indicates an example or instance and does not imply or require any preference for the noted example. Thus, the disclosure is not to be limited to the examples and designs described herein but is to be accorded the widest scope consistent with the principles and novel features disclosed herein.

What is claimed is:

1. A method for system information in a wireless communications system, the method comprising:
   identifying, at a base station, a first value of a major value tag portion and a first value of a minor value tag portion of a value tag for a first carrier, wherein the first value of the major value tag portion and the first value of the minor value tag portion of the value tag is linked with a system information block (SIB) transmitted over the first carrier;
   determining, at the base station, a second value of the major value tag portion and a second value of the minor value tag portion of the value tag for a second carrier, wherein the second value of the major value tag portion of the value tag indicates with respect to the first value of the major value tag portion of the value tag whether the SIB transmitted over the first carrier is to be utilized with respect to the second carrier, wherein the minor value tag portion of the value tag is utilized to indicate a SIB change for the second carrier, wherein the second carrier has a bandwidth different from the first carrier, and wherein one or more offsets are utilized for the SIB transmitted over the second carrier with respect to the SIB transmitted over the first carrier; and
   reducing a frequency of SIB scheduling based at least on utilizing the value tag comprising the major value tag portion and the minor value tag portion.

2. The method of claim 1, further comprising:
   broadcasting, from the base station, the second value of the major value tag portion and the second value of the minor value tag portion of the value tag over the second carrier.

3. The method of claim 2, further comprising:
   receiving, at the base station, the first value of the major value tag portion and the first value of the minor value tag portion of the value tag.

4. The method of claim 1, further comprising:
   synchronizing one or more values of the value tag with respect to the first carrier and the second carrier.

5. The method of claim 1, wherein the determining the second value of the major value tag portion and the second value of the minor value tag portion of the value tag for the second carrier comprises:
   receiving, by the base station, an indication from a second base station different from the base station, the indication including the second value of the major value tag portion and the second value of the minor value tag portion of the value tag for the second carrier.

6. The method of claim 1, wherein the determining the second value of the major value tag portion and the second value of the minor value tag portion of the value tag for the second carrier comprises:
   receiving, by the base station, an indication from a Radio Network Controller (RNC), the indication including the second value of the major value tag portion and the second value of the minor value tag portion of the value tag for the second carrier.

7. The method of claim 4, wherein the synchronizing occurs at least at the base station, the second base station, the RNC, or a core network device.

8. The method of claim 1, wherein the first value of the major value tag portion of the value tag for the first carrier equals the second value of the major value tag portion of the value tag for the second carrier.

9. The method of claim 1, wherein the first value of the major value tag portion of the value tag for the first carrier differs from the second value of the major value tag portion of the value tag for the second carrier.

10. The method of claim 1, wherein the major value tag portion of the value tag is a differential value tag to indicate whether a change of the SIB between the first carrier and the second carrier has occurred.

11. The method of claim 1, wherein the first carrier comprises a normal bandwidth carrier and the second carrier comprises a flexible bandwidth carrier.

12. The method of claim 1, wherein the first carrier comprises a flexible bandwidth carrier and the second carrier comprises a normal bandwidth carrier.

13. The method of claim 1, wherein the first carrier comprises a first flexible bandwidth carrier and the second carrier comprises a second flexible bandwidth carrier.

14. The method of claim 1, wherein the first carrier comprises a first normal bandwidth carrier and the second carrier comprises a second normal bandwidth carrier.

15. A system for system information in a wireless communications system, the system comprising:
means for identifying a first value of a major value tag portion and a first value of a minor value tag portion of a value tag for a first carrier, wherein the first value of the major value tag portion and the first value of the minor value tag portion of the value tag is linked with a system information block (SIB) transmitted over the first carrier;
means for determining a second value of the major value tag portion and a second value of the minor value tag portion of the value tag for a second carrier, wherein the second value of the major value tag portion of the value tag indicates with respect to the first value of the major value tag portion of the value tag whether the SIB transmitted over the first carrier is to be utilized with respect to the second carrier,
wherein the minor value tag portion of the value tag is utilized to indicate a SIB change for the second carrier, wherein the second carrier has a bandwidth different from the first carrier, and wherein one or more offsets are utilized for the SIB transmitted over the second carrier with respect to the SIB transmitted over the first carrier; and
means for reducing a frequency of SIB scheduling based at least on utilizing the value tag comprising the major value tag portion and the minor value tag portion.

16. The system of claim 15, further comprising:
means for broadcasting the second value of the major value tag portion and the second value of the minor value tag portion of the value tag over the second carrier.

17. The system of claim 16, further comprising:
means for receiving the first value of the major value tag portion and the first value of the minor value tag portion of the value tag.

18. The system of claim 15, further comprising:
means for synchronizing one or more values of the value tag with respect to the first carrier and the second carrier.

19. The system of claim 15, wherein the first value of the major value tag portion of the value tag for the first carrier equals the second value of the major value tag portion of the value tag for the second carrier.

20. The system of claim 15, wherein the first value of the major value tag portion of the value tag for the first carrier differs from the second value of the major value tag portion of the value tag for the second carrier.

21. The system of claim 15, wherein the value tag is a differential value tag to indicate whether a change of the SIB between the first carrier and the second carrier has occurred.

22. A non-transitory computer-readable medium storing code for wireless communication, the code comprising instructions executable by at least one processor to:
identify a first value of a major value tag portion and a first value of a minor value tag portion of a value tag for a first carrier, wherein the first value of the value tag is linked with a system information block (SIB) transmitted over the first carrier;
determine a second value of the major value tag portion and a second value of the minor value tag portion of the value tag for a second carrier, wherein the second value of the major value tag portion of the value tag indicates with respect to the first value of the major value tag portion of the value tag whether the SIB transmitted over the first carrier is to be utilized with respect to the second carrier, wherein the minor value tag portion of the value tag is utilized to indicate a SIB change for the second carrier, wherein the second carrier has a bandwidth different from the first carrier, and wherein one or more offsets are utilized for the SIB transmitted over the second carrier with respect to the SIB transmitted over the first carrier; and reduce a frequency of SIB scheduling based at least on utilizing the value tag comprising the major value tag portion and the minor value tag portion.

23. The non-transitory computer-readable medium of claim 22, wherein the computer-readable code that, when executed, further causes the at least one processor to:
broadcast the second value of the major value tag portion and the second value of the minor value tag portion of the value tag over the second carrier.

24. The non-transitory computer-readable medium of claim 23, wherein the computer-readable code that, when executed, further causes the at least one processor to:
receive the first value of the major value tag portion and the first value of the minor value tag portion of the value tag.

25. The non-transitory computer-readable medium of claim 22, wherein the computer-readable code that, when executed, further causes the at least one processor to:
synchronize one or more values of the value tag with respect to the first carrier and the second carrier.

26. A wireless communications device for system information in a wireless communications system, the device comprising:
at least one processor;
memory in electronic communication with the at least one processor; and instructions being stored in the memory and operable, when executed by the at least one processor, to cause the device to:
identify a first value of a major value tag portion and a first value of a minor value tag portion of a value tag for a first carrier, wherein the first value of the major value tag portion and the first value of the minor value tag portion of the value tag is linked with a system information block (SIB) transmitted over the first carrier;
determine a second value of the major value tag portion and a second value of the minor value tag portion of the value tag for a second carrier, wherein the second value of the major value tag portion of the value tag indicates with respect to the first value of the major value tag portion of the value tag whether the SIB transmitted over the first carrier is to be utilized with respect to the second carrier, wherein the minor value tag portion of the value tag is utilized to indicate a SIB change for the second carrier, wherein the second carrier has a bandwidth different from the first carrier, and wherein one or more offsets are utilized for the SIB transmitted over the second carrier with respect to the SIB transmitted over the first carrier; and reduce a frequency of SIB scheduling based at least on utilizing the value tag comprising the major value tag portion and the minor value tag portion.

27. The wireless communications device of claim 26, wherein the instructions are operable, when executed by the at least one processor, to cause the device to broadcast the second value of the major value tag portion and the second value of the minor value tag portion of the value tag over the second carrier.

28. The wireless communications device of claim 27, wherein the instructions are operable, when executed by the at least one processor, to cause the device to receive the first value of the major value tag portion and the first value of the minor value tag portion of the value tag.

29. The wireless communications device of claim 26, wherein the instructions are operable, when executed by the at least one processor, to cause the device to synchronize one or more values of the value tag with respect to the first carrier and the second carrier.

\* \* \* \* \*